(12) United States Patent
Sasagawa et al.

(10) Patent No.: US 10,977,788 B2
(45) Date of Patent: Apr. 13, 2021

(54) IMAGE ANALYSIS METHOD, IMAGE ANALYSIS APPARATUS, AND IMAGE ANALYSIS PROGRAM FOR ANALYZING CELL WITH DEEP LEARNING ALGORITHM

(71) Applicant: SYSMEX CORPORATION, Kobe (JP)

(72) Inventors: Yoshinori Sasagawa, Kobe (JP); Yoshiaki Miyamoto, Kobe (JP); Kazumi Hakamada, Kobe (JP); Kengo Gotoh, Kobe (JP); Yosuke Sekiguchi, Kobe (JP)

(73) Assignee: SYSMEX Corporation, Kobe (JP)

(*) Notice: Subject to any disclaimer, the term of this patent is extended or adjusted under 35 U.S.C. 154(b) by 96 days.

(21) Appl. No.: 15/963,292

(22) Filed: Apr. 26, 2018

(65) Prior Publication Data
US 2018/0315190 A1 Nov. 1, 2018

(30) Foreign Application Priority Data
Apr. 27, 2017 (JP) .............................. JP2017-088743

(51) Int. Cl.
*G06T 7/00* (2017.01)
*G06N 3/08* (2006.01)
(Continued)

(52) U.S. Cl.
CPC .......... *G06T 7/0012* (2013.01); *G06K 9/0014* (2013.01); *G06N 3/08* (2013.01);
(Continued)

(58) Field of Classification Search
CPC ................ G06K 9/0014; G06N 3/08; G06T 2207/10064; G06T 2207/20081;
(Continued)

(56) References Cited

U.S. PATENT DOCUMENTS

2017/0159004 A1* 6/2017 Senda .................... C12M 21/08
2018/0137338 A1* 5/2018 Kraus ................... G06K 9/6259
(Continued)

FOREIGN PATENT DOCUMENTS

CN 103366180 A 10/2013
CN 104992435 A 10/2015
(Continued)

OTHER PUBLICATIONS

Haseda, Keisuke, et al. "Significant correlation between refractive index and activity of mitochondria: single mitochondrion study." Biomedical optics express 6.3 (2015): 859-869. (Year: 2015).*
(Continued)

*Primary Examiner* — Nirav G Patel
(74) *Attorney, Agent, or Firm* — Metrolex IP Law Group, PLLC

(57) ABSTRACT

An image analysis method according one or more embodiments may analyze a form of a cell using a deep learning algorithm with a structure of a neural network. The image analysis method may include: generating data for analysis from an image for analysis in which an analysis target cell is captured; inputting the data for analysis into the deep learning algorithm; and generating data indicating a form of the analysis target cell using the deep learning algorithm.

18 Claims, 18 Drawing Sheets

(51) Int. Cl.
*G06T 7/11* (2017.01)
*G06T 7/187* (2017.01)
*G06K 9/00* (2006.01)

(52) U.S. Cl.
CPC ............... *G06T 7/11* (2017.01); *G06T 7/187* (2017.01); *G06T 2207/10064* (2013.01); *G06T 2207/20081* (2013.01); *G06T 2207/30024* (2013.01)

(58) Field of Classification Search
CPC ......... G06T 2207/30024; G06T 7/0012; G06T 7/11; G06T 7/187
See application file for complete search history.

(56) References Cited

U.S. PATENT DOCUMENTS

2018/0211380 A1* 7/2018 Tandon ................ G06T 7/0012
2019/0012787 A1* 1/2019 Chefd'hotel ....... G06K 9/00127

FOREIGN PATENT DOCUMENTS

| GB | 2466818 A | 7/2010 |
|---|---|---|
| JP | 2016-534709 A | 11/2016 |
| JP | 2017-120229 A | 7/2017 |
| WO | 2015/065697 A1 | 5/2015 |

OTHER PUBLICATIONS

Kraus, Oren Z., et al. "Automated analysis of high-content microscopy data with deep learning." Molecular systems biology 13.4 (2017). (Year: 2017).*

David A. Van Valen et al, "Deep Learning Automates the Quantitative Analysis of Individual Cells in Live-cell Imaging Experiments, Journal PLOS Computational Biology", Nov. 4, 2016, p. 1-24, vol. 12, No. 11, DOI: 10.1371/journal.pdbi.1005177; Cited in the extended European search report dated Sep. 14, 2018 in a counterpart European patent application.

Saad Ullah Akram et al., "Cell Segmentation Proposal Network for Microscopy Image Analysis", 2016 IEEE International Conference on Image Processing (ICIP), Sep. 1, 2016, pp. 3199-3203, DOI: 10.1109/ICIP.2016.7532950; Cited in the extended European search report dated Sep. 14, 2018 in a counterpart European patent application.

The Communication pursuant to Article 94(3) EPC dated May 20, 2020 in a counterpart European patent application.

* cited by examiner

IMAGE ANALYSIS METHOD, IMAGE ANALYSIS APPARATUS, AND IMAGE ANALYSIS PROGRAM FOR ANALYZING CELL WITH DEEP LEARNING ALGORITHM

CROSS REFERENCE TO RELATED APPLICATIONS

This application claims priority from prior Japanese Patent Application No. 2017-088743 filed with the Japan Patent Office on Apr. 27, 2017, the entire contents of which are incorporated herein by reference.

BACKGROUND

The disclosure relates to an image analysis method, apparatus, and program and a method of producing a deep learning algorithm.

In recent years, a method has been developed for making a computer recognize cells in microscopic images including the cells and the like. For example, International Publication WO2015/065697 (Patent Document 1) discloses a method in which a user inputs particular pixels in a microscopic image into a computer, the particular pixels including pixels associated with cells (or regions of cells) of a certain type and pixels where the cells are not present, training data is generated based on the input data, and a trained model is created by machine training techniques.

In the regenerative medicine, currently attempts are being made to use stem cells made by gene recombination techniques, such as induced pluripotent stem cells, in addition to hematopoietic stem cells and umbilical cord blood stem cells which have been used for transplantation.

As for cells to be transplanted, the cell characteristics need to be checked before transplantation, such as the state of differentiation of the cells and the possibility that the cells will not become cancerous after transplantation. For example, in the case where stem cells are first differentiated into, for example, myocardial cells or retinal cells, which are then transplanted, it needs to be checked whether the stem cells are sufficiently differentiated into the target cells.

On the other hand, stem cells or differentiated cells to be transplanted have to avoid treatment such as staining. Accordingly, characteristics of cells before transplantation need to be determined from the cells not stained, for example, by using an image of the cells captured by a phase-contrast microscope.

Cell characteristics are currently determined by human eyes. However, the number of cells to be transplanted at one time is so enormous that it is difficult to check all the cells to be transplanted. Thus, making computers observe cells is expected to lead to more efficient identification of the characteristics of cells before transplantation.

However, the techniques disclosed in Patent Document 1 or other techniques are actually not sufficient to discriminate the forms of actual cells, and hence they have not been put into practical use.

SUMMARY

An image analysis method according one or more embodiments may analyze a form of a cell using a deep learning algorithm with a structure of a neural network. The image analysis method may include: generating data for analysis from an image for analysis in which an analysis target cell is captured; inputting the data for analysis into the deep learning algorithm; and generating data indicating a form of the analysis target cell using the deep learning algorithm.

An image analysis apparatus according to one or more embodiments may analyze a form of a cell using a deep learning algorithm with a structure of a neural network. The image analysis apparatus may include a processing section that: generates data for analysis from an image for analysis in which an analysis target cell is captured; inputs the data for analysis into the deep learning algorithm; and generates data indicating a form of the analysis target cell using the deep learning algorithm.

A non-transitory computer-readable recording medium storing a computer program according one or more embodiments may be used to analyze a form of a cell using a deep learning algorithm with a structure of a neural network and cause a computer to perform operations. The operations may include: generating data for analysis from an image for analysis in which an analysis target cell is captured; inputting the data for analysis into the deep learning algorithm; and generating data indicating a form of the analysis target cell using the deep learning algorithm.

A method of producing a deep learning algorithm according to one or more embodiments may include: acquiring first training data indicating a form of a learning target cell; acquiring second training data indicating a correct answer of the form of the learning target cell; and learning a deep learning algorithm using a neural network including an input layer using the first training data and an output layer using the second training data.

An image analysis method according to one or more embodiments may analyze a region of a cell using a deep learning algorithm. The image analysis method may include: generating pieces of data for analysis from an image for analysis in which one or more analysis target cells are captured, each piece of the data for analysis corresponding to an area containing a certain number of pixels in the image for analysis; inputting the pieces of the data for analysis into the deep learning algorithm; and generating, with the deep learning algorithm, pieces of data indicating the respective areas of the one or more analysis target cells.

DETAILED DESCRIPTION

Figure 1:
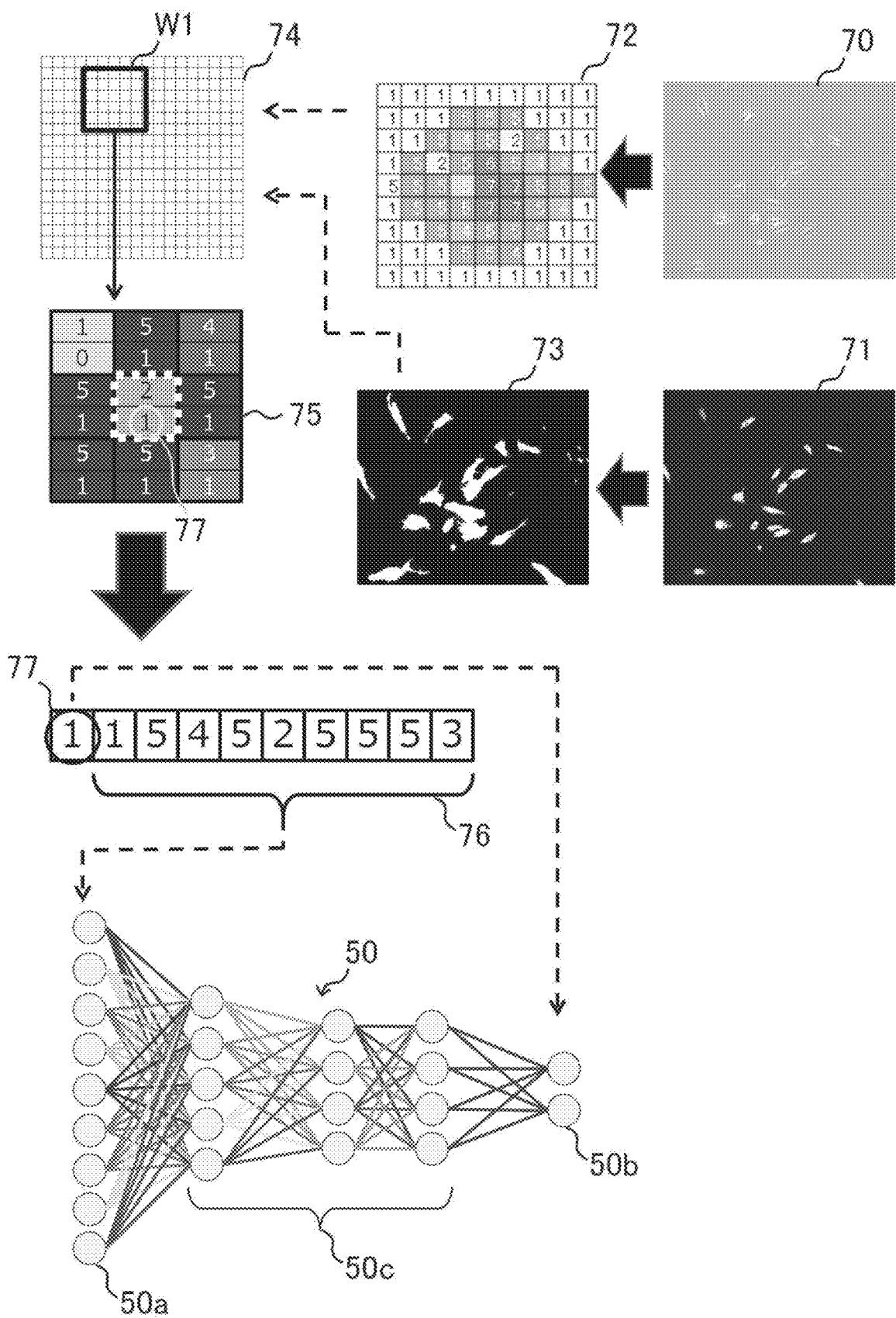
FIG. 1 is a schematic diagram illustrating an overview of a deep learning method.

One or more aspects may provide an image analysis method of analyzing the forms of cells more accurately.

An aspect is an image analysis method. An image analysis method in an embodiment is an image analysis method of analyzing a form of a cell using a deep learning algorithm (60) with a structure of a neural network, including: generating data for analysis (80) from an image for analysis (78) in which an analysis target cell (S21 to S23) is captured; inputting the data for analysis (80) into the deep learning algorithm (60) (S24); and generating data (83) indicating a form of the analysis target cell using the deep learning algorithm (60) (S25 to S28). This makes it possible to analyze the form of an analysis target cell more accurately.

It may be preferable that the image for analysis (78) include the analysis target cells. This makes it possible to analyze the forms of cells efficiently in a subject including analysis target cells.

It may be preferable to generate data (83) indicating the form of each of the analysis target cells, using the deep learning algorithm (60). This makes it possible to efficiently analyze the forms of cells in a subject including analysis target cells.

It may be preferable to determine a region of the analysis target cell as the form of the cell, using the deep learning algorithm (60). This makes it possible to analyze cell regions as the forms of analysis target cells more accurately.

It may be preferable to generate the data for analysis (80) for each area containing a certain number of pixels in the image for analysis (78). This makes it possible to improve the determination accuracy of the neural network (60).

It may be preferable that the data for analysis (80) be generated for each area containing the certain number of pixels, the pixels including a specified pixel and pixels surrounding the specified pixel, and that the deep learning algorithm (60) generates a label (82) indicating a cell form for the specified pixel based on the inputted data for analysis (80). This makes it possible to improve the determination accuracy of the neural network (60).

It may be preferable that the certain number of pixels be equal to the number of nodes in an input layer (60a) of the neural network (60). This makes it possible to improve the determination accuracy of the neural network (60).

It may be preferable that the area be different depending on the type of the analysis target cell. This makes it possible to select the area of pixels in a certain number depending on the type of the analysis target cell and improve the determination accuracy of the neural network (60).

It may be preferable that the area be different depending on the size of the analysis target cell. This makes it possible to select the area of pixels in a certain number depending on the size of the analysis target cell and improve the determination accuracy of the neural network (60).

It may be preferable that the image for analysis (78) be a phase difference image or a differential interference contrast image of the analysis target cell. This makes it possible to easily prepare an image for analysis using a common phase-contrast microscope or differential interference microscope without a need for a special imaging apparatus to capture the analysis target cell.

It may be preferable that the image for analysis (78) be an image in which the analysis target cells, apart from one another, are captured. This makes it possible to improve the determination accuracy of the neural network (60).

It may be preferable that the deep learning algorithm (60) discriminate the form of each of the analysis target cells, apart from one another. This makes it possible to efficiently analyze the forms of cells in a subject including analysis target cells.

It may be preferable that the image for analysis (78) be an image in which a cell of a single type is captured. This makes it possible to improve the determination accuracy of the neural network (60).

It may be preferable that the image for analysis (78) be an image in which a cell for transplantation is captured. This makes it possible to efficiently analyze the form of a cell for transplantation, which cannot be stained for observation.

It may be preferable that training data (74) used for learning of the deep learning algorithm (60) be generated based on a fluorescence image (71) of a stained cell. With this, by making the deep learning algorithm learn in advance, it is possible to efficiently analyze the form of the cell that cannot be stained for observation, without staining the cell.

It may be preferable that the training data (74) include a label value extracted from the fluorescence image (71) and indicating a form of the cell. This makes it possible to make the neural network (60) learn the label value indicating the form of the cell.

It may be preferable that the training data (74) include the label value for every pixel in the fluorescence image (71). This makes it possible to make the neural network (60) learn the label value indicating the form of a cell.

It may be preferable that the training data (75) be generated for each area containing a certain number of pixels in the fluorescence image (71) of the stained cell. This makes it possible to make the neural network (60) learn with high accuracy the label value indicating the form of a cell.

It may be preferable that the deep learning algorithm (60) classify the data for analysis (80) into classes each indicating the form of the analysis target cell. This makes it possible to make classification into cell regions and a background region which is a region other than the cell regions, as for the form of the analysis target cell.

It may be preferable that an output layer (60b) of the neural network (60) be a node including a softmax function as an activation function. This makes it possible for the neural network (60) to classify the form of an analysis target cell into a finite number of classes.

It may be preferable that the deep learning algorithm (60) generate data (82) indicating the form of the analysis target cell per unit pixel every time the data for analysis (80) is inputted to the deep learning algorithm (60). This makes it possible to analyze the form of a cell for every unit pixel (one pixel) in an image for analysis in which an analysis target cell is captured.

It may be preferable that as the deep learning algorithm (60), a deep learning algorithm (60) be generated for each type of the analysis target cell. This makes it possible to use a different deep learning algorithm (60) depending on the type of an analysis target cell, and thus improve the determination accuracy of the neural network (60).

Further, it may be preferable that a type of the analysis target cell be selected, and that the deep learning algorithm (60) corresponding to the selected cell among the deep learning algorithms (60) be used to process the data for analysis (80). This makes it possible to use a different deep learning algorithm (60) depending on the type of an analysis target cell, and thus improve the determination accuracy of the neural network (60).

An aspect is an image analysis apparatus. In an embodiment, an image analysis apparatus (200A) used to analyze a form of a cell using a deep learning algorithm (60) with a structure of a neural network, includes a processing section (20A) that generates data for analysis (80) from an image for analysis (78) in which an analysis target cell is captured, inputs the data for analysis (80) into the deep learning algorithm (60), and generates data indicating a form of the analysis target cell using the deep learning algorithm (60). This makes it possible to analyze the form of an analysis target cell more accurately.

An aspect is a computer program. A computer program in an embodiment is a computer program that is used to analyze a form of a cell using a deep learning algorithm (60) with a structure of a neural network and causes a computer to execute a process, the process including: generating data for analysis (80) from an image for analysis (78) in which an analysis target cell is captured; inputting the data for analysis (80) into the deep learning algorithm (60); and generating data indicating a form of the analysis target cell using the deep learning algorithm (60). This makes it possible to analyze the form of an analysis target cell more accurately.

An aspect is a method of producing a deep learning algorithm. In an embodiment, a method of producing a deep learning algorithm (60), includes: a first acquisition step of acquiring first training data (72) indicating a form of a learning target cell; a second acquisition step of acquiring second training data (73) indicating a correct answer of the form of the learning target cell; and a learning step of causing a deep learning algorithm to learn by using the first training data (72) and the second training data (73) as training data, the deep learning algorithm (50) using a neural network including an input layer (50a) using the first training data (72) and an output layer (50b) using the second training data (73) (S13 to S19). This makes it possible to produce a deep learning algorithm for analyzing the form of an analysis target cell more accurately.

It may be preferable that the method further includes: a step (S11) of generating the first training data from a first training image before the first acquisition step; and a step (S12) of generating the second training data from a second training image in which the learning target cell is captured, before the second acquisition step. This makes it possible to produce a deep learning algorithm for analyzing the form of an analysis target cell more accurately.

It may be preferable that the first training image (70) be a phase difference image or a differential interference contrast image of the learning target cell, and that the second training image (71) be a fluorescence image (71) of the learning target cell that is stained. This makes it possible to easily prepare an image for analysis using a common phase-contrast microscope or differential interference microscope without a need for a special imaging apparatus to capture an analysis target cell. In addition, by making the deep learning algorithm learn in advance, it is possible to efficiently analyze the form of a cell that cannot be stained for observation, without staining.

It may be preferable that the first training image (70) and the second training image (71) be images in which a cell for transplantation is captured. This makes it possible to efficiently analyze the form of a cell for transplantation, which cannot be stained for observation.

An aspect is an image analysis method. An image analysis method in an embodiment is an image analysis method of analyzing a region of a cell using a deep learning algorithm (60), including: generating pieces of data for analysis (80) from an image for analysis (78) in which one or more analysis target cells are captured, each piece of the data for analysis corresponding to an area containing a certain number of pixels in the image for analysis (78); inputting the pieces of the data for analysis (80) into the deep learning algorithm (60); and generating pieces of data using the deep learning algorithm (60), the pieces of the data indicating the respective areas of the analysis target cells. This makes it possible to analyze a cell region as the form of an analysis target cells more accurately.

One or more aspects may make it possible to analyze the forms of analysis target cells more accurately.

Figure 3:
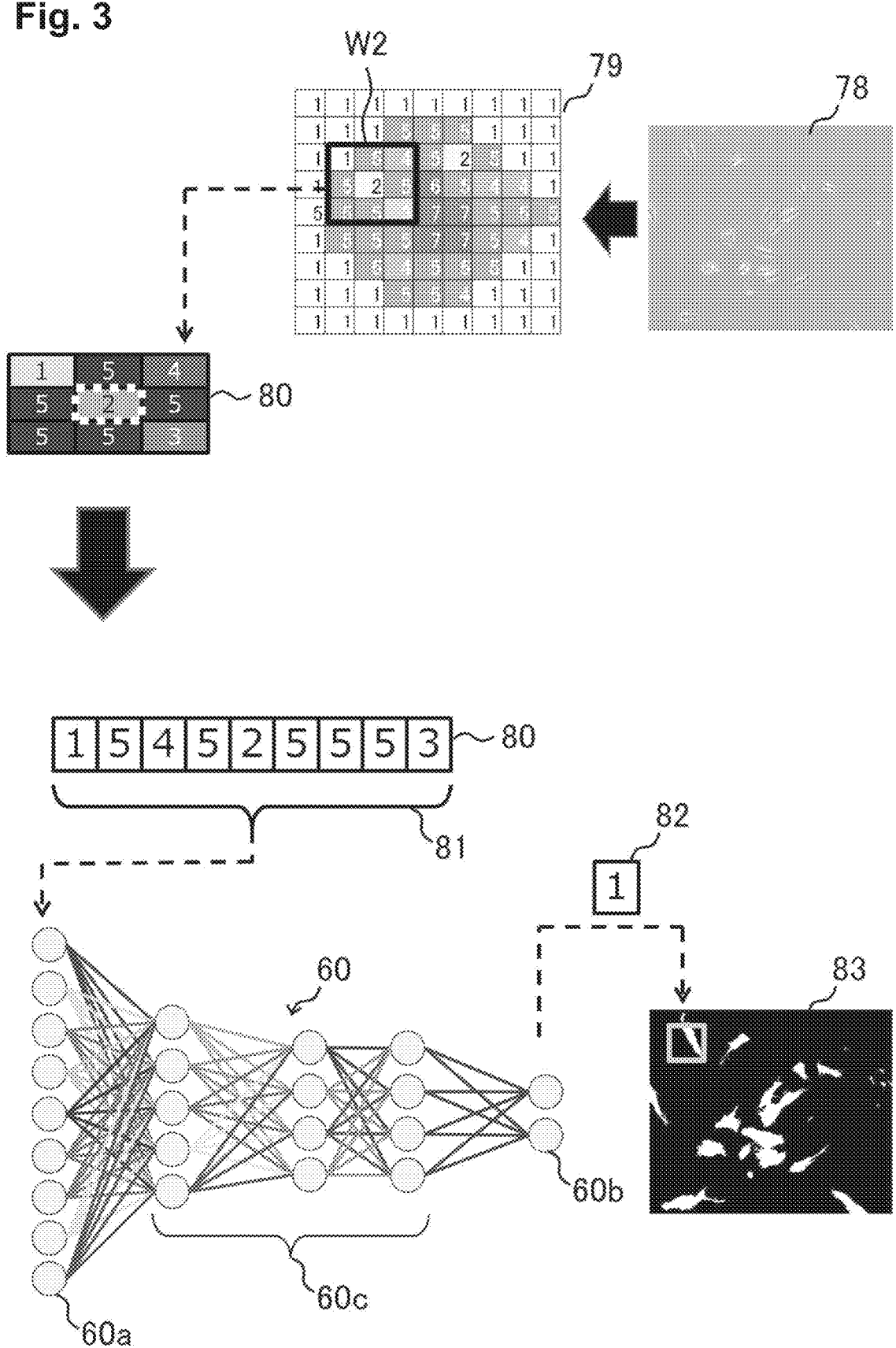
FIG. 3 is a schematic diagram illustrating an overview of an image analysis method.

Hereinafter, an overview and embodiments are described in detail with reference to the attached drawings. In the following, as a first training image and a second training image for learning to be used in deep learning, a phase difference image 70 and a fluorescence image 71 of stained cells, illustrated in FIG. 1, are used, respectively. As data for analysis of an analysis target to be used in image analysis processing, a phase difference image 78 of cells, illustrated in FIG. 3, is used. It is assumed that the forms of cells of the discrimination target which a neural network 50 learns as a correct answer are cell regions.

In the overview and the embodiments, description is provided as an example for a case where the cell regions of mesenchymal stem cells (hereinafter referred to as MSCs) included in an image are discriminated using a deep learning algorithm with a neural network structure. The MSCs for analysis are cells for transplantation and are preferably cultured alone without other cells. Note that in the following description and drawings, the same reference numerals indicate the same or similar constituents, so that description of the same or the similar constituents is omitted.

[Overview of Deep Learning Method and Image Analysis Method]

In the following, first, the overview of a deep learning method and an image analysis method are described. After that, embodiments are described in detail.

Overview of Deep Learning Method

As illustrated in FIG. 1, in the deep learning method, from the phase difference image (first training image) 70 in which learning target cells are captured is generated a gradation image (first training data) 72 indicating the form of each learning target cell, and from the fluorescence image (second training image) 71 in which the learning target cells are captured is generated a true value image (true value image 73) indicating the form of each learning target cell. The learning target cells, which are MSCs as described above, exist in a state where the cells are apart from one another. The phase difference image 70 and the fluorescence image 71 are images of stained cells and can be acquired in advance using, for example, a known phase-contrast microscope. Hereinafter, the number of pixels of the phase difference image 70 and the fluorescence image 71 acquired with a phase-contrast microscope is called a whole image size. The imaging positions of the fluorescence image 71 and the phase difference image 70 are the same as each other.

The phase difference image 70 is converted into data as a grayscale image, in which the brightness value of each pixel is gradated, to obtain the gradation image 72 with the whole image size. In the gradation image 72 illustrated in FIG. 1 as an example indicates brightness values gradated in eight levels, value 0 to value 7, (3 gradations) instead of a grayscale image of 3 gradations.

A fluorescence image 71 with two or more gradations of a grayscale or a colored fluorescence image 71 is converted into data as a black-and-white fluorescence image by binarization to obtain the true value image 73. The true value image 73 is a black-and-white true value image 73 and is used as a correct answer which the neural network 50 learns. In the case where the forms of cells which the neural network 50 discriminates are, for example, cell regions, the true value image 73 is data indicating the correct answer of the cell regions. The fluorescence image 71 is binarized, so that the cell regions and the background region, which are regions other than the cells, are distinguished, and the cell regions are discriminated. The judgement of whether a portion is a background region or a cell region is made, for example, by comparing the gradation of each pixel in the image to a predetermined condition (for example, a threshold of gradation).

In the deep learning method, the gradation image 72 and the true value image 73 are used as training data 74, and a deep learning algorithm using the neural network 50 that has an input layer 50a of the gradation image 72 and an output layer 50b of the true value image 73 is learned. In other words, a pair of the gradation image 72 and the true value image 73 is used as the training data 74 for the neural network 50.

Figure 2A:
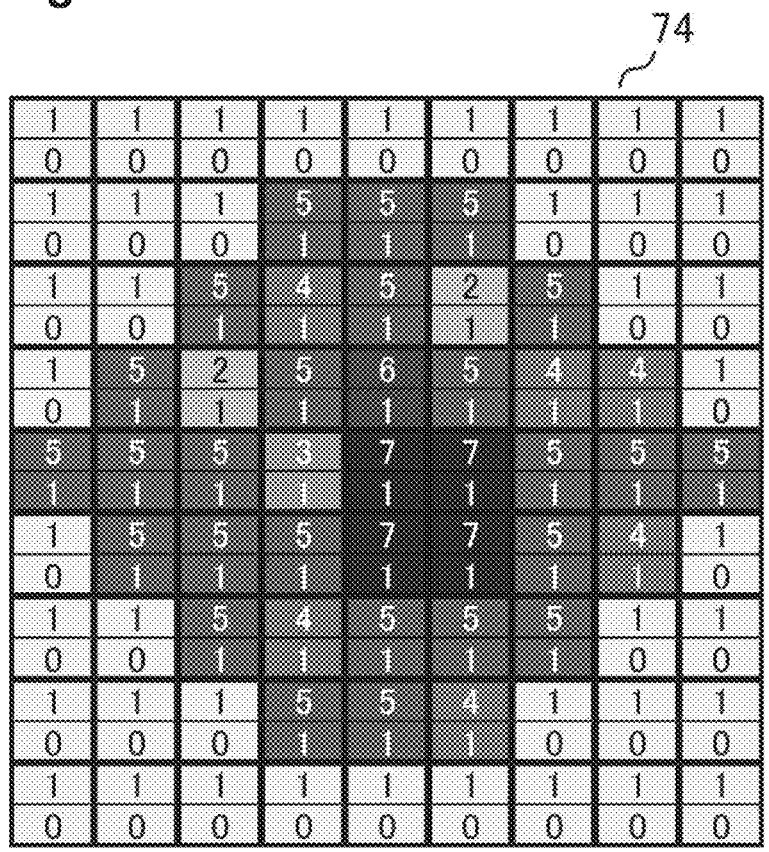
FIGS. 2A to 2C are schematic diagrams illustrating details of training data.
Figure 2B:
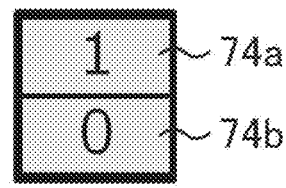
Figure 2C:
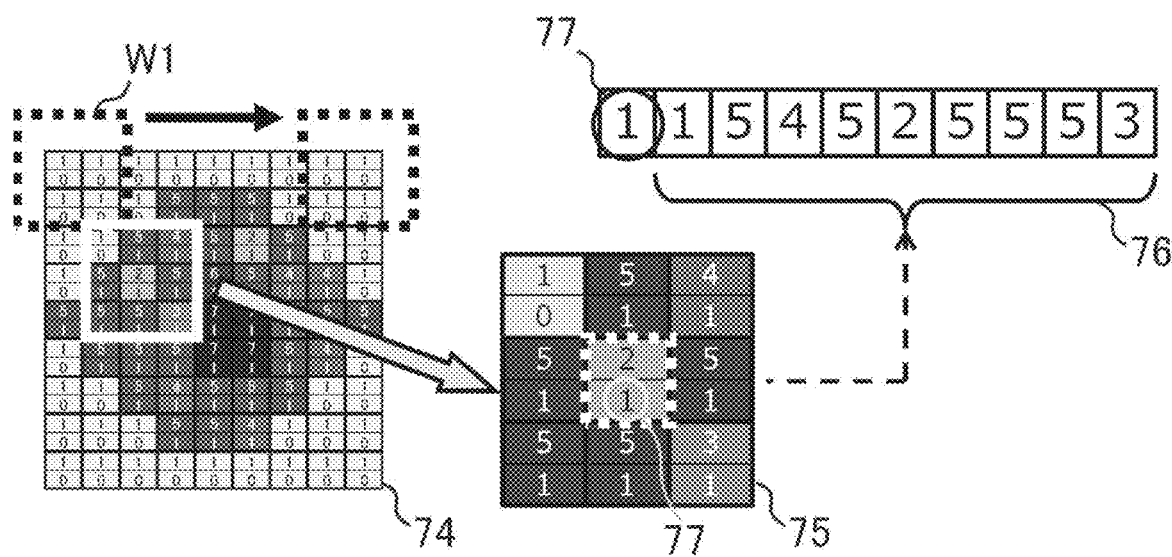

With reference to FIGS. 2A to 2C, a method of generating the training data 74 is described. The training data 74 illustrated in FIG. 2A is data with the whole image size combining the gradation image 72 and the true value image 73. The training data 74, which is simplified for convenience of explanation, has 9 pixels in the vertical direction and 9 pixels in the horizontal direction, 81 pixels in total, of the gradation image 72 and the true value image 73.

FIG. 2B illustrates an example of a pixel included in the training data 74. The value 74a indicated in the upper part of the figure is gradation value data of the gradation image 72, and the value 74b indicated at the lower part of the figure is binary data of the true value image 73. The brightness of each pixel of the gradation image 72, indicated in the upper part, is gradated into eight levels, value 0 to value 7 (3 gradations). As for the gradation value, for example, black is defined as a gradation value of 7, then, gradually, a smaller value is assigned as the degree of white increases, and white is defined as a gradation value of 0. Binary data 77 of the true value image 73 indicated in the lower part is also called a label value. It is assumed, for example, that a label value of 0 indicates the background, and a label value of 1 indicates a cell region. In other words, in the true value image 73 illustrated in FIG. 1, the positions of the pixels where the label value is changed from 0 to 1 or the pixels where the label value is changed from 0 to 1 correspond to the boundaries between the background region and the cell regions.

Training data 75 is data obtained by extracting an area of a certain number of pixels (hereinafter referred to as a "window size") out of the training data 74 illustrated in FIG. 2A. For example, as illustrated in FIG. 2C, a window W1 with a size of 3×3 pixels is set, and the window W1 is shifted relatively with respect to the training data 74. The center of the window W1 is positioned at one of the pixels in the training data 74, and for example, part of the training data 74 within the window W1 indicated with a white frame is extracted as the training data 75. The extracted training data 75 is used for learning of the neural network 50 illustrated in FIG. 1.

As illustrated in FIG. 1, the number of nodes in the input layer 50a of the neural network 50 corresponds to the number of pixels in the training data 75 to be inputted. Out of the training data 75, gradation values 76 of the pixels corresponding to the gradation image 72 are used as the input layer 50a of the neural network, and the binary data 77 of the centered pixel corresponding to the true value image 73 is used as the output layer 50b of the neural network, for learning of the neural network 50.

In this way, the training data 75 to be inputted into the neural network 50 is not created by the user but can be generated automatically by a computer. This promotes efficient deep learning of the neural network 50.

As illustrated in FIG. 2C, in the initial state, the center of the window W1 is positioned at the upper left corner of the training data 74. After that, every time training data 75 is extracted by the window W1 and the neural network 50 learns, the position of the window W1 is shifted. Specifically, the window W1 is shifted in steps of one pixel such that the center of the window W1 scans all the pixels in the training data 74. This allows the training data 75 extracted from all the pixels in the training data 74 to be used in the learning of the neural network 50. This improves the learning level of the neural network 50, and the deep learning provides a deep learning algorithm 60 with a neural network structure illustrated in FIG. 3.

Overview of Image Analysis Method

As illustrated in FIG. 3, in the image analysis method, data for analysis 80 is generated from a phase difference image (image for analysis) 78 in which at least one cell as an analysis target is captured. The phase difference image 78 can also be acquired, for example, using a known phase-contrast microscope. Hereinafter, the number of pixels in the phase difference image 78 for analysis acquired with a phase-contrast microscope is called a whole image size. The phase difference image 78 is converted into data as a grayscale image, in which the brightness value of each pixel is gradated, to obtain a gradation image 79 with the whole image size. The gradation image 79 illustrated in FIG. 3 as an example indicates brightness values gradated in eight levels, value 0 to value 7, (3 gradations) instead of a grayscale image of 3 gradations. From the gradation image 79 with the whole image size, data for analysis 80 is extracted using a window W2 with a size of 3×3 pixels.

In the image analysis method, the data for analysis 80 is processed to generate data 83 indicating the forms of the analysis target cells, by using the deep learning algorithm 60 with a neural network structure for discriminating the forms of cells included in an input image, the deep learning algorithm 60 having learned using the training data 75 illustrated in FIG. 1. The deep learning algorithm 60 is a neural network subjected to learning which has been obtained by making the neural network 50 learn in the deep learning method described above.

Referring to FIG. 3 again, the data for analysis 80 extracted from the gradation image 79 is inputted to the deep learning algorithm 60. The number of nodes in an input layer 60a of the deep learning algorithm 60 corresponds to the number of pixels to be inputted. The data for analysis 80 is inputted to the deep learning algorithm 60, and then an estimated value 82 (a binary value) of the pixel at the center of the image for analysis with the window size is outputted at an output layer 60b.

After that, while the window W2 is shifted in steps of one pixel such that the center of the window W2 scans all the pixels in the gradation image 79, the data for analysis 80 with the window size is extracted, and the extracted data for analysis 80 is inputted to the deep learning algorithm 60. This process provides a binary image with the whole image size as the data 83 illustrating the forms of the analysis target cells.

As described in the overview of the deep learning method, the training data 75 for obtaining the deep learning algorithm 60 is not created by the user but can be generated automatically by a computer. This promotes efficient deep learning of the neural network 50, as a result, improves the efficiency of the morphological analysis of cells in the image analysis method.

First Embodiment

In a first embodiment, description is provided specifically for a system configuration to implement the deep learning method and the image analysis method described the above overview.

[Outline of Configuration]

Figure 4:
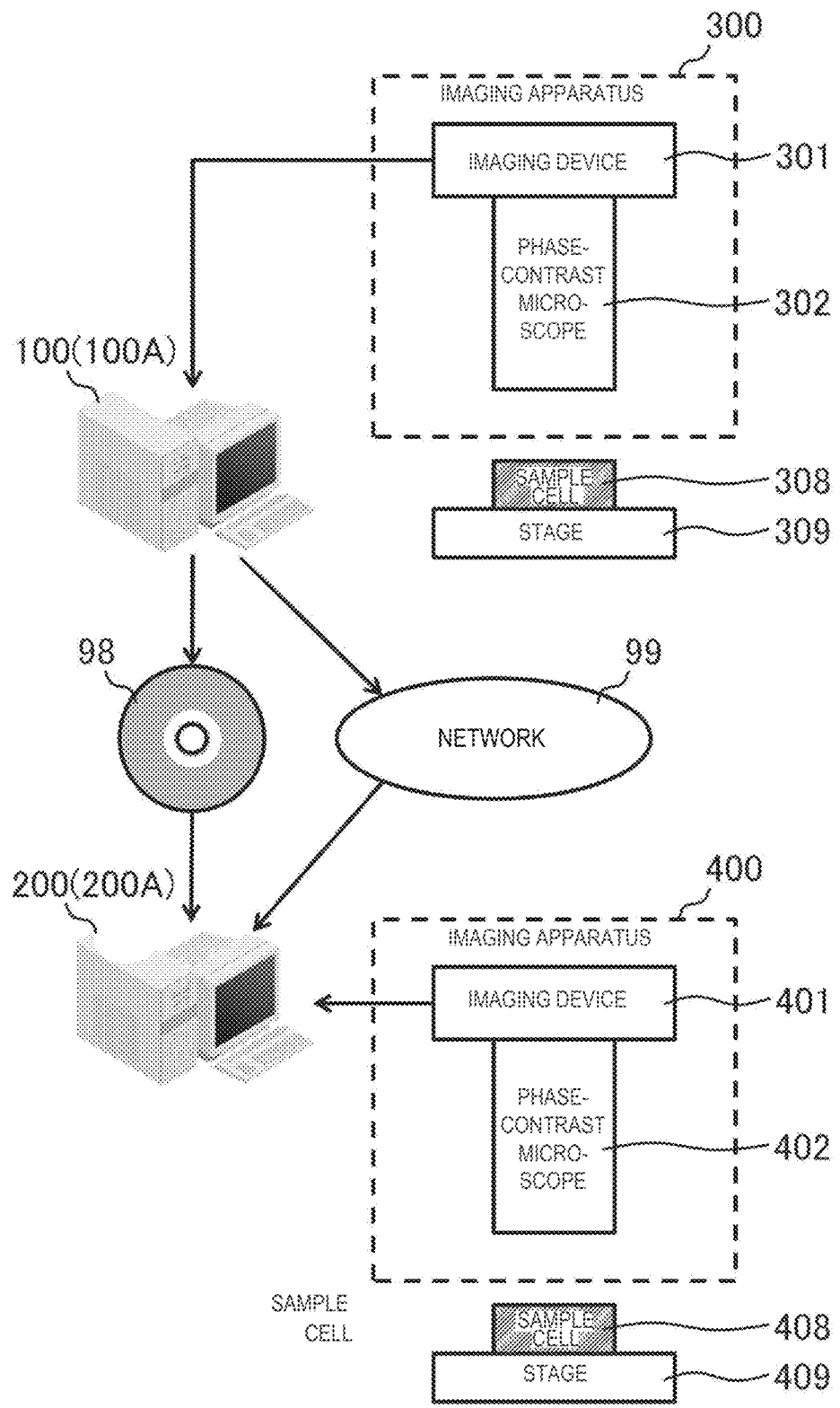
FIG. 4 is a schematic configuration diagram illustrating an image analysis system according to a first embodiment.

Referring to FIG. 4, an image analysis system according to a first embodiment includes a deep learning apparatus 100A and an image analysis apparatus 200A. A vendor side apparatus 100 operates as the deep learning apparatus 100A, and a user side apparatus 200 operates as the image analysis apparatus 200A. The deep learning apparatus 100A performs learning of a neural network 50 and provides the user with a deep learning algorithm 60. The deep learning algorithm 60 is provided from the deep learning apparatus 100A to the image analysis apparatus 200A through a recording medium 98 or a network 99. The image analysis apparatus 200A analyzes images for analysis, using the deep learning algorithm 60.

The deep learning apparatus 100A, including, for example, a general-purpose computer, performs deep learning processing based on a flowchart to be described later. The image analysis apparatus 200A, including, for example, a general-purpose computer, performs image analysis processing based on a flowchart to be described later. The recording medium 98 is a computer readable non-transitory tangible recording medium, such as a DVD-ROM or a USB memory, for example.

The deep learning apparatus 100A is connected to an imaging apparatus 300. The imaging apparatus 300 includes an imaging device 301 and a phase-contrast microscope 302 and captures phase difference images and fluorescence images of sample cells 308 for learning placed on a stage 309. The sample cells 308 for learning are stained in advance using fluorescent dye. The deep learning apparatus 100A acquires a phase difference image 70 and a fluorescence image 71 captured by the imaging apparatus 300.

The image analysis apparatus 200A is connected to an imaging apparatus 400. The imaging apparatus 400 includes an imaging device 401 and a phase-contrast microscope 402 and captures phase difference images of sample cells 408 for analysis placed on a stage 409. The image analysis apparatus 200A acquires a phase difference image 78 captured by the imaging apparatus 400.

For the imaging apparatuses 300 and 400, known phase-contrast microscopes with functions capable of imaging samples for observation can be used.

[Hardware Configuration]

Figure 5:
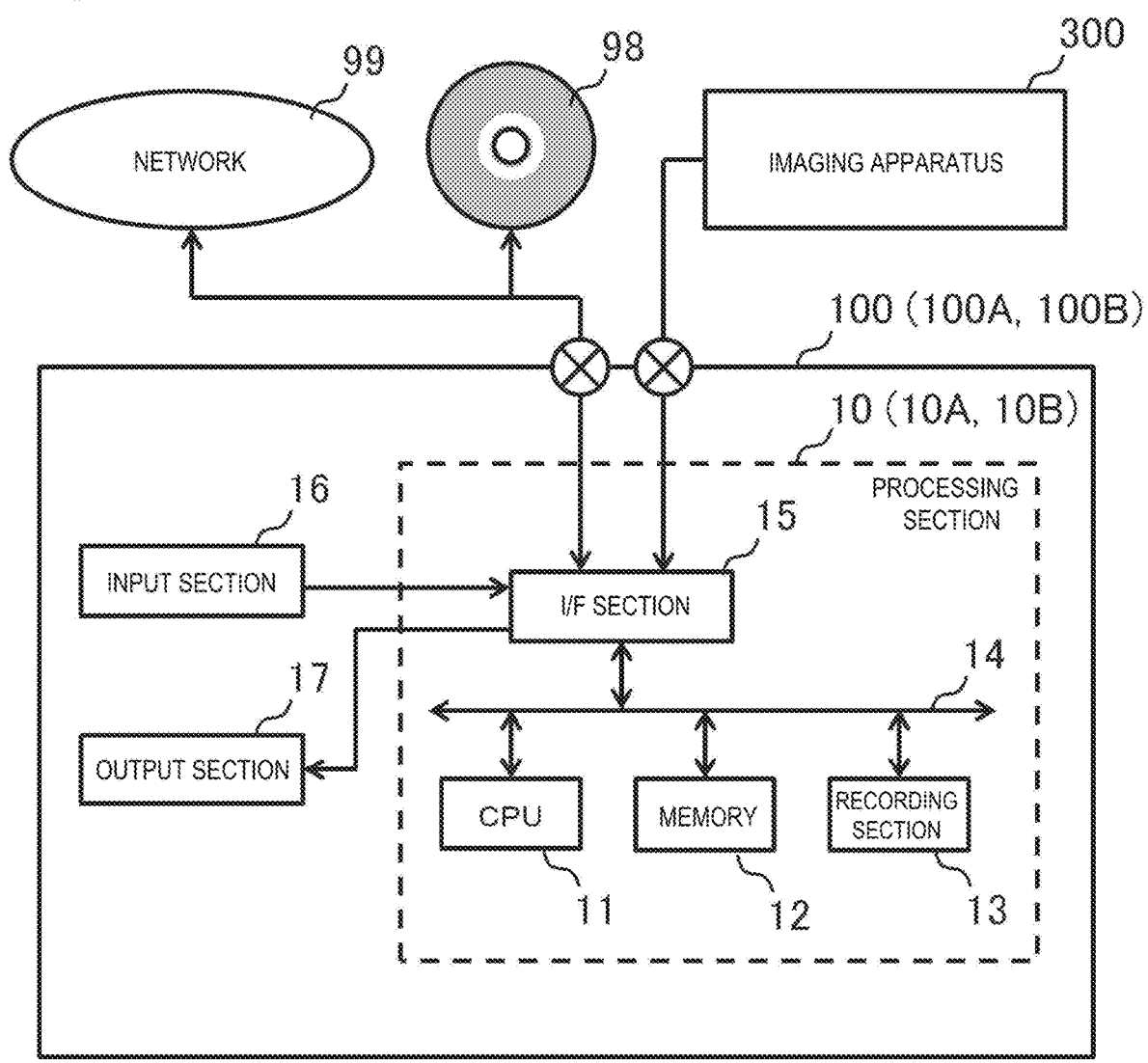
FIG. 5 is a block diagram illustrating the hardware configuration of a vendor side apparatus 100.

Referring to FIG. 5, the vendor side apparatus 100 (100A, 100B) includes a processing section 10 (10A, 10B), an input section 16, and an output section 17.

The processing section 10 includes a central processing unit (CPU) 11 which performs data processing described later, a memory 12 used as a work area for data processing, a recording section 13 where a program and processing data described later are recorded, a bus 14 through which data are transmitted between the sections, and an interface section 15 through which data are inputted from and outputted to external devices. The input section 16 and the output section 17 are connected to the processing section 10. As an example, the input section 16 is an input apparatus such as a keyboard or a mouse, and the output section 17 is a display apparatus such as a liquid crystal display.

In the processing section 10, to process the steps to be described in the following FIG. 8, the program and the neural network 50 before learning according to an embodiment are recorded in advance in the recording section 13, for example, in an executable form (which, for example, is generated by conversion from a form in a programming language using a compiler). The processing section 10 uses the program and the neural network 50 before learning recorded in the recording section 13 to perform processing.

In the following description, unless otherwise noted, the processing performed by the processing section 10 means the processing performed by the CPU 11 based on the program and the neural network 50 stored in the recording section 13 or the memory 12. The CPU 11 temporarily stores necessary data (such as intermediate data during processing) into the memory 12 as a work area and records the data to be stored for a long time such as calculation results into the recording section 13 as appropriate.

Figure 6:
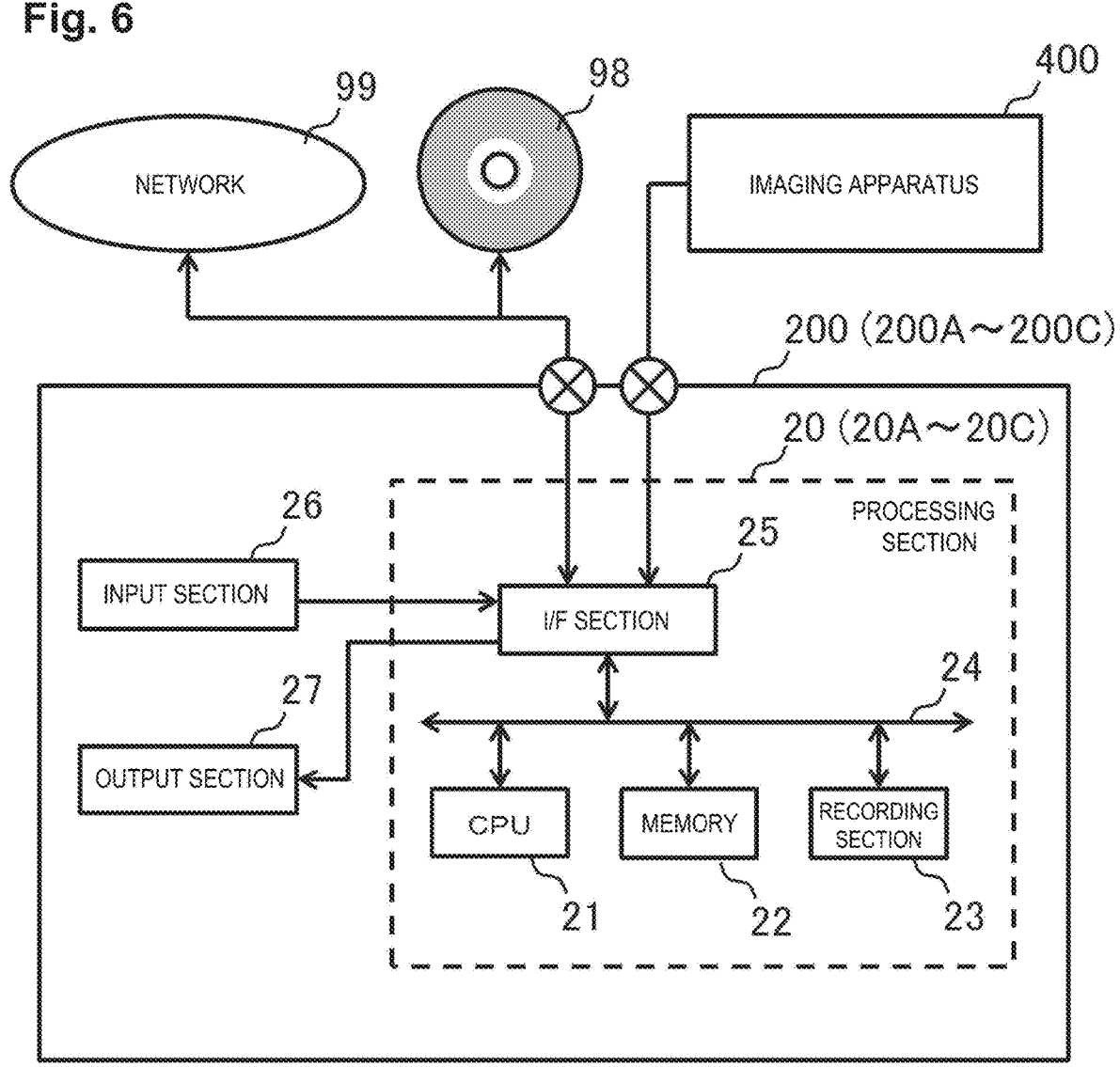
FIG. 6 is a block diagram illustrating the hardware configuration of a user side apparatus 200.

Referring to FIG. 6, the user side apparatus 200 (200A, 200B, 200C) includes a processing section 20 (20A, 20B, 20C), an input section 26, and an output section 27.

The processing section 20 includes a central processing unit (CPU) 21 which performs data processing described later, a memory 22 used as a work area for data processing, a recording section 23 where a program and processing data described later are recorded, a bus 24 through which data are transmitted data between the sections, and an interface section 25 through which data are inputted from and outputted to external devices. The input section 26 and the output section 27 are connected to the processing section 20. As an example, the input section 26 is an input apparatus such as a keyboard or a mouse, and the output section 27 is a display apparatus such as a liquid crystal display.

In the processing section 20, to process the steps to be described in the following FIG. 11, the program and the deep learning algorithm 60 with a neural network structure, which is a neural network subjected to learning, according to an embodiment are recorded in advance in the recording section 23, for example, in an executable form (which, for example, is generated by conversion from a form in a programing language using a compiler). The processing section 20 uses the program and the deep learning algorithm 60 recorded in the recording section 23 to perform processing.

In the following description, unless otherwise noted, the processing performed by the processing section 20 means the processing actually performed by the CPU 21 in the processing section 20 based on the program and the deep learning algorithm 60 stored in the recording section 23 or the memory 22. The CPU 21 temporarily stores necessary data (such as intermediate data during processing) into the memory 22 as a work area and records the data to be stored for a long time such as calculation results into the recording section 23 as appropriate.

[Function Blocks and Processing Procedure] Deep Learning Processing

Figure 7:
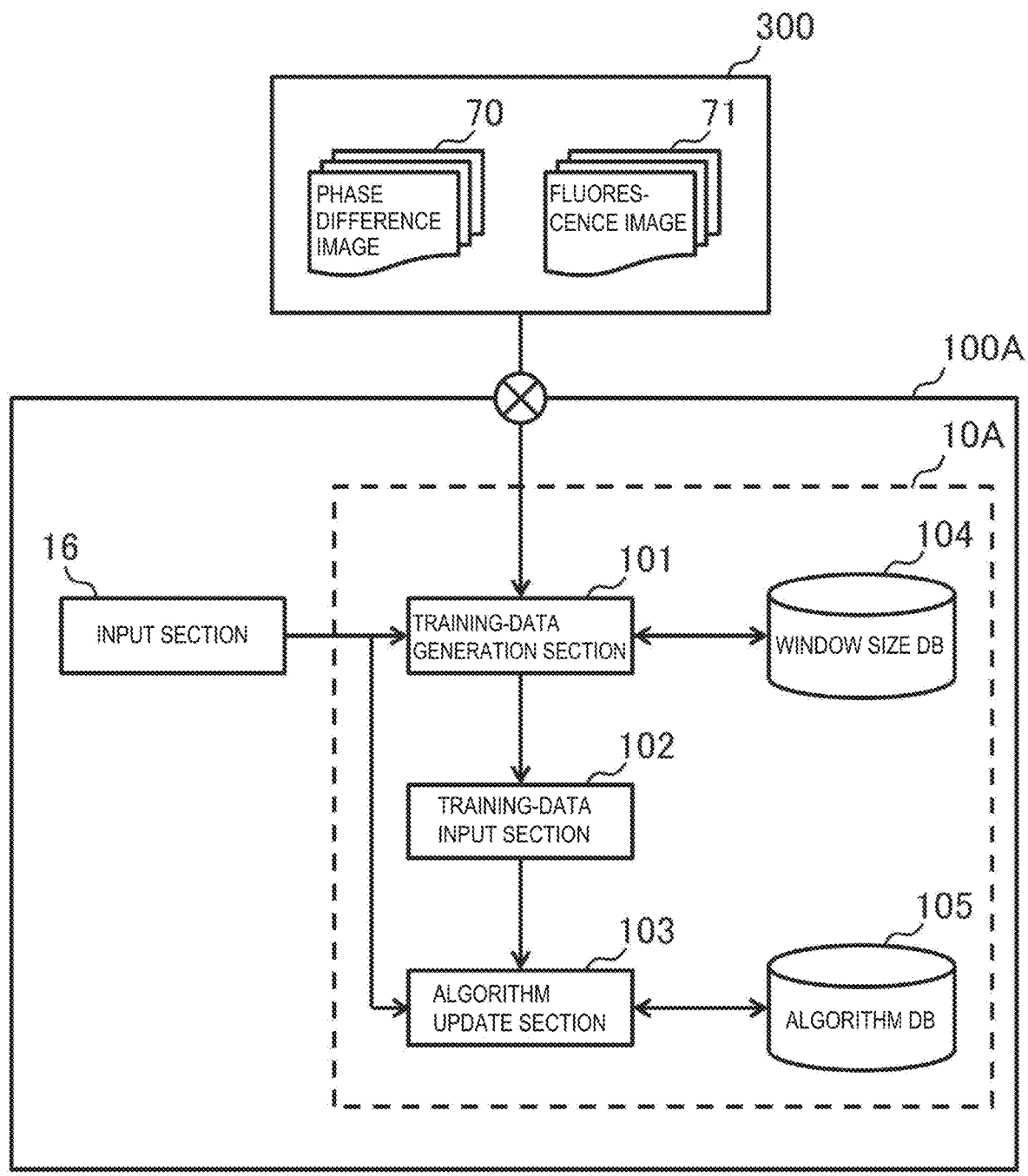
FIG. 7 is a block diagram illustrating functions of a deep learning apparatus 100A according to a first embodiment.

Referring to FIG. 7, the processing section 10A in the deep learning apparatus 100A according to a first embodiment includes a training-data generation section 101, a training-data input section 102, and an algorithm update section 103. These function blocks are implemented by a program that causes a computer to execute deep learning processing being installed into the recording section 13 or memory 12 in the processing section 10A and executed by the CPU 11. A window size database 104 and an algorithm database 105 are recorded in the recording section 13 or memory 12 in the processing section 10A.

It is assumed that phase difference images 70 and fluorescence images 71 for learning are captured beforehand by the imaging apparatus 300 and recorded in advance in the recording section 13 or memory 12 in the processing section 10A. The neural network 50 before learning is stored in advance in the algorithm database 105.

Figure 8:
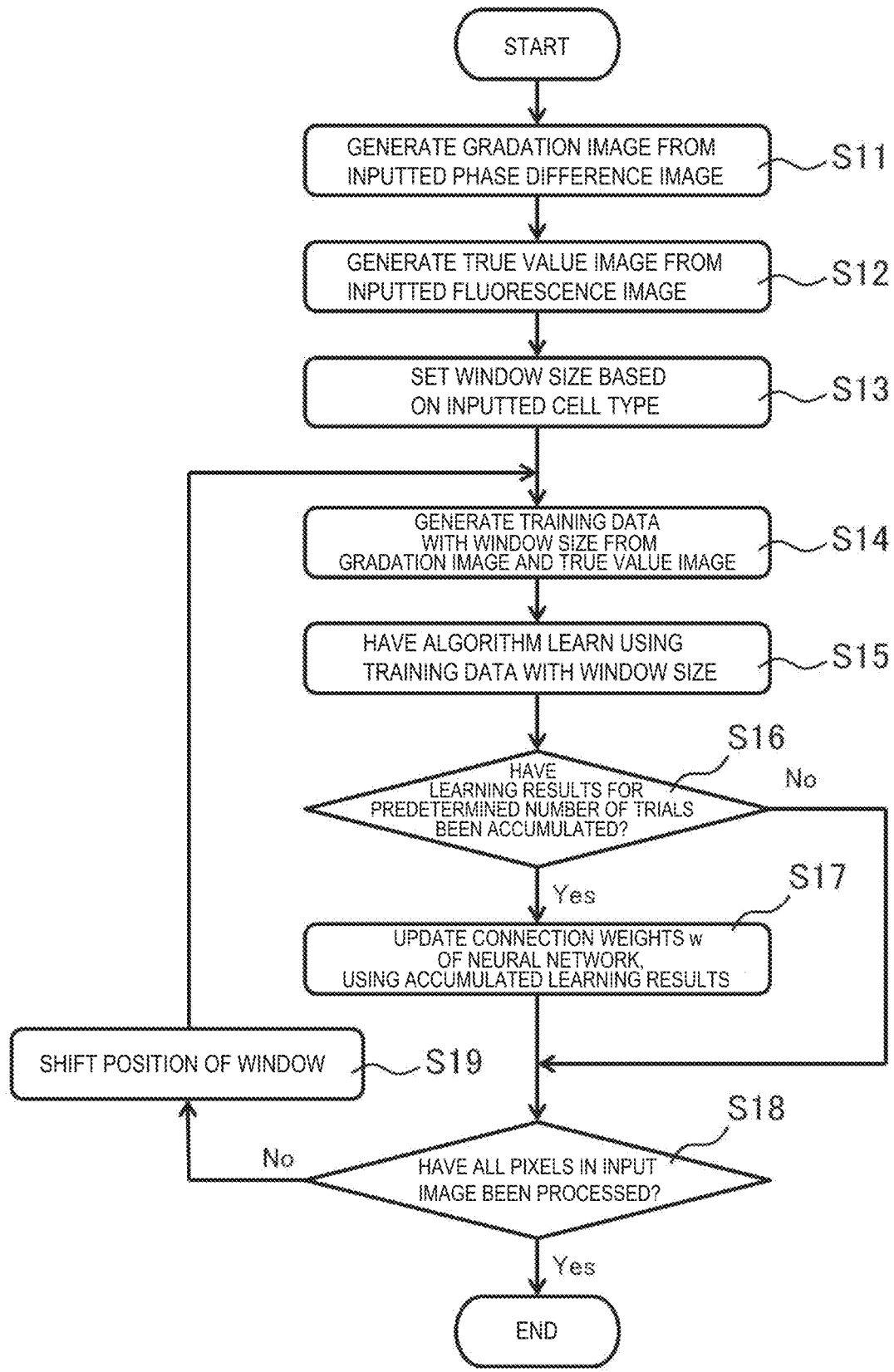
FIG. 8 is a flowchart illustrating procedure for deep learning processing.

The processing section 10A in the deep learning apparatus 100A performs processing illustrated in FIG. 8. Explaining this with reference to the function blocks illustrated in FIG. 7, the processing at steps S11 to S13, and at steps S18 and S19 is performed by the training-data generation section 101. The processing at step S14 is performed by the training-data input section 102. The processing at steps S15 to S17 is performed by the algorithm update section 103.

In the following description of steps S11 to S19, deep learning processing for a pair of input images is explained. A pair of input images is a pair of a phase difference image 70 with the whole image size and a fluorescence image 71 with the whole image size which are acquired using, for example, a known phase-contrast microscope.

At step S11, the processing section 10A generates a gradation image 72 from the inputted phase difference image 70. The gradation image 72 is created by gradating the brightness values of the pixels in the phase difference image 70 and converting them into a grayscale. In an embodiment, the gradation image 72 is created as a grayscale image with eight levels of brightness values, value 0 to value 7 (in other words, 3 gradations). As for assigning gradation values, for example, black is defined as a gradation value of 7, then, gradually, a smaller value is assigned as the degree of white increases, and white is defined as a gradation value of 0.

At step S12, the processing section 10A binarizes the gradations of the pixels in the inputted fluorescence image 71 to generate a true value image 73. The true value image 73 (binarized image 73) constitutes training data which the neural network 50 learns as a correct answer. The binarization is performed by, for example, comparing the gradations of the pixels in an image with a predetermined threshold.

At step S13, the processing section 10A receives input of the type of learning target cells from an operator on the deep learning apparatus 100A side through the input section 16. The processing section 10A refers to the window size database 104 based on the inputted cell type to set a window size. In an embodiment in which the analysis targets are MSCs, the window size is set to, for example, a size of 3×3 pixels. The window size is a unit of the training data inputted to the neural network 50 at a time and corresponds to the number of nodes of the input layer 50a. The window size is associated with the cell type and recorded in advance in the window size database 104.

At step S14, the processing section 10A generates training data 75 with the window size from the gradation image 72 and true value image 73 with the whole image size. Specifically, as described with reference to FIGS. 2A to 2C in the above "Overview of Deep Learning Method", the training data 75 is generated from training data 74 combining the gradation image 72 and the true value image 73, using the window W1.

At step S15 illustrated in FIG. 8, the processing section 10A has the neural network 50 learn using the training data 75. The learning results of the neural network 50 are accumulated every time the neural network 50 learns using the training data 75.

In the image analysis method according to an embodiment, the stochastic gradient descent method is used, so that at step S16, the processing section 10A determines whether learning results for a predetermined number of trials have been accumulated. If learning results for a predetermined number of trials have been accumulated, the processing section 10A performs the processing at step S17. If learning results have not been accumulated for a predetermined number of trials, the processing section 10A performs the processing at step S18.

If learning results for a predetermined number of trials have been accumulated, the processing section 10A, at step S17, updates connection weights w of the neural network 50, using the learning results which have been accumulated at step S15. In the image analysis method according to an embodiment, the stochastic gradient descent method is used, so that when the learning results for a predetermined number of trials have been accumulated, the connection weights w of the neural network 50 are updated. Specifically, the processing to update the connection weights w is the processing to perform the calculation according to the gradient descent method, expressed in Formula 11 and Formula 12 to be described later.

At step S18, the processing section 10A determines whether all the pixels in the input image have been processed. The input image is the training data 74 with the whole image size, and if a series of processing from step S14 to step S17 has been performed on all the pixels in the training data 74 with the whole image size, the deep learning processing ends.

If all the pixels in the input image have not been processed, the processing section 10A, at step S19, shifts the center position of the window at a step of one pixel within the training data 74 with the whole image size as illustrated in FIG. 2C. After that, the processing section 10A performs the series of processing from step S14 to step S17 at the new window position after the shift. Specifically, at step S14, the processing section 10A extracts training data 74 with the window size at the new window position after the shift, and then at step S15, the processing section 10A has the neural network 50 learn using the newly extracted training data 75 with the window size. If learning results for a predetermined number of trials have been accumulated at step S16, the processing section 10A updates the connection weights w of the neural network 50 at step S17. Learning of the neural network 50 for each window size data as above is performed for all the pixels in the training data 74 with the whole image size.

The deep learning processing from step S11 to step S19 for a pair of input images described above is repeatedly performed for multiple pairs of different input images to improve the level of learning of the neural network 50 and obtain the deep learning algorithm 60 with a neural network structure illustrated in FIG. 3.

Structure of Neural Network

Figure 9A:
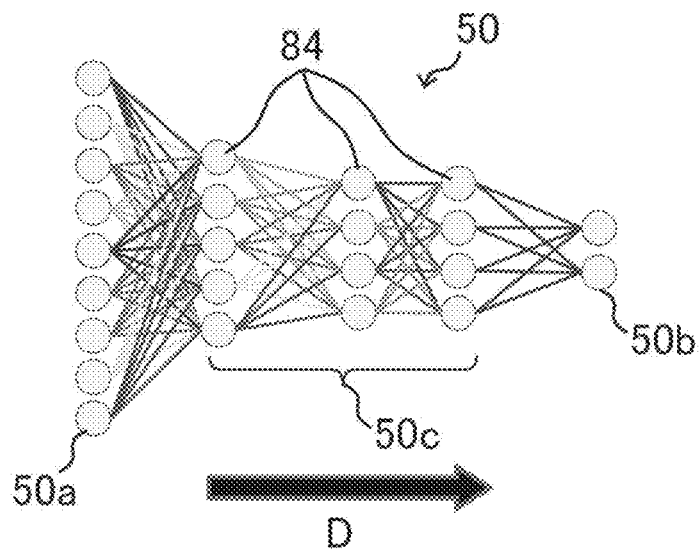
FIGS. 9A to 9C are schematic diagrams illustrating details of learning by a neural network.

As illustrated in part FIG. 9A, a first embodiment uses a neural network of a deep learning type. A neural network of a deep learning type means a neural network including an input layer 50a, an output layer 50b, and middle layers 50c which is between the input layer 50a and the output layer 50b and includes multiple layers, as the neural network 50 illustrated in FIGS. 9A to 9C. The number of layers included in the middle layers 50c can be, for example, five or more.

In the neural network 50, nodes 84 are arranged in layers and connected only between adjacent layers. This allows information to be propagated from the layer 50a on the input side to the layer 50b on the output side only in one direction indicated with arrow D in the figure. The number of nodes in the input layer 50a, corresponding to the number of pixels in the images to be inputted, corresponds to the number of pixels in the window W1 illustrated in FIG. 2C. Since pixel data (gradation values) of an image can be inputted into the input layer 50a, the user can input the input image into the input layer 50a without separately calculating a feature amount from the input image.

Calculation at Each Node

Figure 9B:
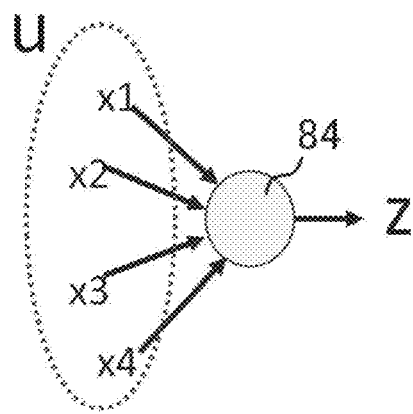

FIG. 9B is a schematic diagram illustrating calculation at each node. The node 84 receives multiple inputs (u) and calculates one output (z). In the case of the example illustrated in FIG. 9B, the node 84 receives four inputs. The total input (u) which the node 84 receives is expressed by the following Formula 1.

[Math. 1]

$$u = w1x1 + w2x2 + w3x3 + w4x4 + b \quad \text{(Formula 1)}$$

Each input is multiplied by a different weight w. The value b in Formula 1) is a value called a bias. Output (z) of the node is an output of a certain function f with respect to the total input (u) expressed by Formula 1 and is expressed by the following Formula 2. Function f is called an activation function.

[Math. 2]

$$z = f(u) \quad \text{(Formula 2)}$$

Figure 9C:
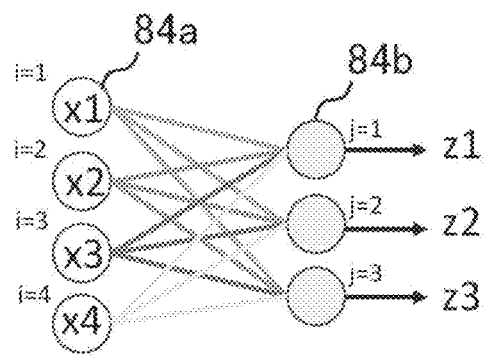

FIG. 9C is a schematic diagram illustrating calculation between the nodes. In the neural network 50, the nodes outputting result (z) expressed by Formula 2 with respect to total input (u) expressed by Formula 1 are arranged in layers. Outputs from the nodes in the previous layer are inputted to the nodes in the next layer. In the example illustrated in FIG. 9C, the outputs from nodes 84a in the left layer in the figure are inputted to nodes 84b in the right layer in the figure. Each node 84b in the right layer receives the outputs from all the nodes 84a in the left layer. The connection between each node 84a in the left layer and each node 84b in the right layer is multiplied by a different weight $w_{ij}$. Assuming that x1 to x4 are the outputs of the nodes 84a in the left layer, the inputs to the nodes 84b (j=1, 2, 3) in the right layer are expressed by the following Formula 3-1 to Formula 3-3.

[Math. 3]

$$u1 = w11x1 + w12x2 + w13x3 + w14x4 + b1 \quad \text{(Formula 3-1)}$$

$$u2 = w21x1 + w22x2 + w23x3 + w24x4 + b2 \quad \text{(Formula 3-2)}$$

$$u3 = w31x1 + w32x2 + w33x3 + w34x4 + b3 \quad \text{(Formula 3-3)}$$

Generalizing these Formula 3-1 to Formula 3-3 provides Formula 3-4. Here, i=1, . . . , I and j=1, . . . , J.

[Math. 4] (Formula 3-4)

$$u_j = \sum_{i=1}^{I} w_{ji} x_i + b_j$$

Applying Formula 3-4 to the activation function yields output. The output is expressed by the following Formula 4.

[Math. 5]

$$z_j = f(u_j)(j=1,2,3) \quad \text{(Formula 4)}$$

Activation Function

In the image analysis method according to an embodiment, the rectified linear unit function is used as the activation function. The rectified linear unit function is expressed by the following Formula 5.

[Math. 6]

$$f(u) = \max(u, 0) \quad \text{(Formula 5)}$$

Formula 5 is a function obtained by setting u=0 to the part u<0 of the linear function with z=u. In the example illustrated in FIG. 9C, using Formula 5, the output of the node with j=1 is expressed by the following formula.

$$z1 = \max((w11x1 + w12x2 + w13x3 + w14x4 + b1), 0) \quad \text{[Math. 7]}$$

Assuming that y(x:w) is a function expressed using the neural network, function y(x:w) changes when parameter w of the neural network is changed. Adjusting function y(x:w) such that the neural network selects more suitable parameter w with respect to input x is called learning of the neural network. It is assumed that sets of input and output of a function expressed using the neural network are given. Assuming that the desirable output for input x is d, the pairs of input and output are given as $\{(x_1, d_1), (x_2, d_2), \ldots, (x_n, d_n)\}$. The set of pairs expressed as (x, d) is called training data. Specifically, the set of pairs of a gradation value of brightness of the phase difference image and a label of the true value image at each pixel illustrated in FIG. 2B is training data illustrated in FIG. 2A.

Learning of a neural network means adjusting weights w such that output $y(x_n:w)$ of the neural network with respect to given input $x_n$ is as close to output $d_n$ as possible for any pair of input and output $(x_n, d_n)$. An error function is a scale for measuring how close the function expressed by the neural network is to the training data.

$$y(x_n: w) \approx d_n \quad \text{[Math. 8]}$$

Error function E(w) used in the image analysis method according to an embodiment is expressed by the following Formula 6. Formula 6 is called cross entropy.

[Math. 9] (Formula 6)

$$E(w) = -\sum_{n=1}^{N} \sum_{k=1}^{K} d_{nk} \log y_k(xn; w)$$

A method of calculating the cross entropy in Formula 6 is described. In the output layer 50b of the neural network 50 used in the image analysis method according to an embodiment, in other words, in the last layer of the neural network, an activation function is used for classifying inputs x into a finite number of classes according to the contents. The activation function is called a softmax function and expressed by the following Formula 7. Note that it is assumed that in the output layer 50b, as many nodes as the number of classes k are arranged. It is assumed that total input u of each node k (k=1, ..., K) in output layer L is given as $u_k^{(L)}$ from the outputs of the previous layer L−1. With this, the output of the k-th node in the output layer is expressed by the following Formula 7.

[Math. 10]

$$y_k \equiv z_k^{(L)} = \frac{\exp(u_k^{(L)})}{\sum_{j=1}^{K} \exp(u_j^{(L)})} \quad \text{(Formula 7)}$$

Formula 7 is the softmax function. The sum of outputs $y_1, \ldots, y_K$ determined by Formula 7 is always 1.

Expressing each class as $C_1, \ldots, C_K$, output $y_K$ of node k in output layer L (that is, $u_k^{(L)}$) represents the probability that given input x belongs to class $C_K$. Refer to the following Formula 8. Input x is classified into a class which allows the probability expressed by Formula 8 to be the largest.

[Math. 11]

$$p(C_k|x) = y_k = z_k^{(L)} \quad \text{(Formula 8)}$$

In learning of the neural network, considering a function expressed by the neural network as a model of the posterior probability of each class, the likelihood of weights w to the training data is evaluated under such a probabilistic model, and weights w which maximize the likelihood are selected.

It is assumed that target output $d_n$ by the softmax function of Formula 7 is 1 only if the output is a correct class, and otherwise, target output $d_n$ is 0. Expressing the target outputs in a vector format of $d_n=[d_{n1}, \ldots, d_{nK}]$, in the case, for example, where the correct class of input $x_n$ is $C_3$, only target output $d_{n3}$ is 1, and the other target outputs are 0s. When encoding in this way, the posterior distribution is expressed by the following Formula 9.

[Math. 12]

$$p(d|x) = \prod_{k=1}^{K} p(C_k|x)^{d_k} \quad \text{(Formula 9)}$$

Likelihood L(w) of weights w to the training data $\{(x_n, d_n)\}$ (n=1, ..., N) is expressed by the following Formula 10. The logarithm of likelihood L(w) is taken and the sign is inverted to derive the error function of Formula 6.

[Math. 13]

$$L(w) = \prod_{n=1}^{N} p(d_n|x_n; w) = \prod_{n=1}^{N} \prod_{k=1}^{K} p(C_k|x_n)^{d_{nk}} = \prod_{n=1}^{N} \prod_{k=1}^{K} (y_k(x;w))^{d_{nk}} \quad \text{(Formula 10)}$$

Learning means minimizing error function E(w) calculated based on the training data with respect to parameter w of the neural network. In the image analysis method according an embodiment, error function E(w) is expressed by Formula 6.

Minimizing error function E(w) with respect to parameter w has the same meaning as finding a local minimum point of function E(w). Parameter w is a weight of the connection between the nodes. A minimum point of weight w is obtained by iterative calculation of iteratively updating parameter w from an arbitrary initial value as a starting point. An example of such calculation is the gradient descent method.

In the gradient descent method, a vector expressed by the following Formula 11 is used.

[Math. 14]

$$\nabla E = \frac{\partial E}{\partial w} = \begin{bmatrix} \frac{\partial E}{\partial w_1} & \cdots & \frac{\partial E}{\partial w_M} \end{bmatrix} \quad \text{(Formula 11)}$$

In the gradient descent method, processing to move the value of current parameter w in the negative gradient direction (that is, $-\nabla E$) is iterated many times. Assuming that w(t) is the current weight and that $w^{(t+1)}$ is the weight after moving, the calculation in the gradient descent method is expressed by the following Formula 12. Value t means the number of times parameter w is moved.

[Math. 15]

$$w^{(t+1)} = w^{(t)} - \epsilon \nabla E \quad \text{(Formula 12)}$$

[Math. 16]

$$\epsilon$$

This symbol is a constant to determine the magnitude of the update amount of parameter w and is called a learning constant. By iterating the calculation expressed by Formula 12, as value t increases, error function $E(w^{(t)})$ decreases, and parameter w reaches a minimum point.

Note that the calculation according to Formula 12 may be performed on all the training data (n=1, ..., N) or may be performed on only part of the training data. The gradient descent method performed on only part of the training data is called the stochastic gradient descent method. The image analysis method according to an embodiment uses the stochastic gradient descent method.

Image Analysis Processing

Figure 10:
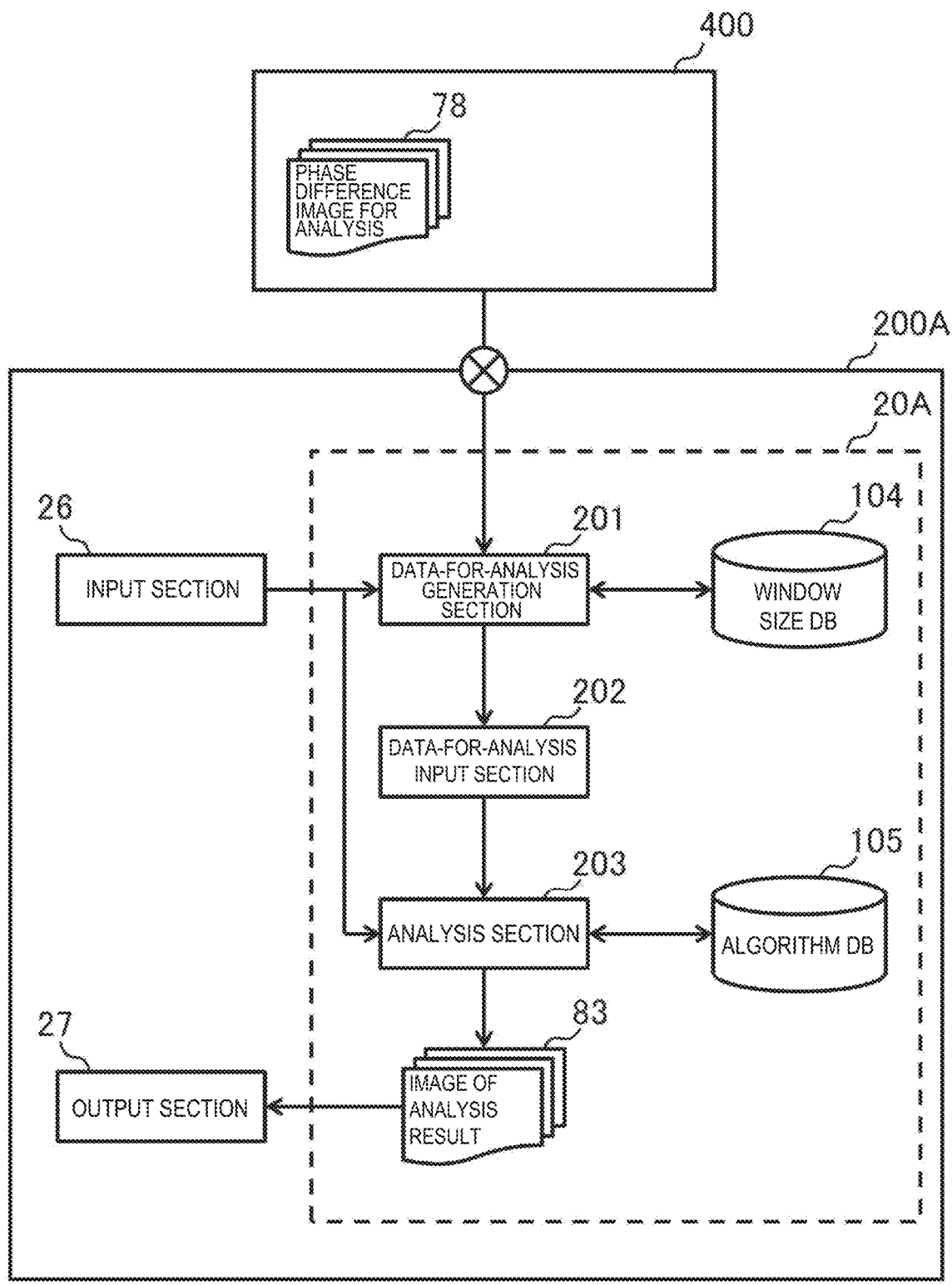
FIG. 10 is a block diagram illustrating functions of an image analysis apparatus 200A according to a first embodiment.

Referring to FIG. 10, the processing section 20A in the image analysis apparatus 200A according to a first embodiment includes a data-for-analysis generation section 201, a data-for-analysis input section 202, and an analysis section 203. These function blocks are implemented by a program according to an embodiment that causes a computer to execute the image analysis processing being installed into the recording section 23 or memory 22 in the processing section 20A and executed by the CPU 21. The window size database 104 and the algorithm database 105 are provided from the deep learning apparatus 100A through the recording medium 98 or the network 99 and recorded in the recording section 23 or memory 22 in the processing section 20A.

It is assumed that phase difference images 78 of analysis target cells are captured beforehand by the imaging apparatus 400 and recorded in advance in the recording section 23 or memory 22 in the processing section 20A. The deep learning algorithm 60 including the connection weights w subjected to learning is stored in the algorithm database 105 and functions as a program module that is part of a program to cause a computer to execute the image analysis processing. In other words, the deep learning algorithm 60 is used by a computer including a CPU and a memory and causes the computer to execute calculation or processing on specific information according to the purpose of use, the calculation or processing being outputting data indicating the forms of analysis target cells. Specifically, according to the algorithm defined in the deep learning algorithm 60 recorded in the recording section 23 or the memory 22, the CPU 21 in the processing section 20A performs calculation of the neural network 60 based on connection weights w subjected to learning on a phase difference image 78 capturing analysis target cells and inputted into the input layer 60a, and then, the CPU 21 outputs a binary image 83, which is data indicating the forms of the analysis target cells, from the output layer 60b.

Figure 11:
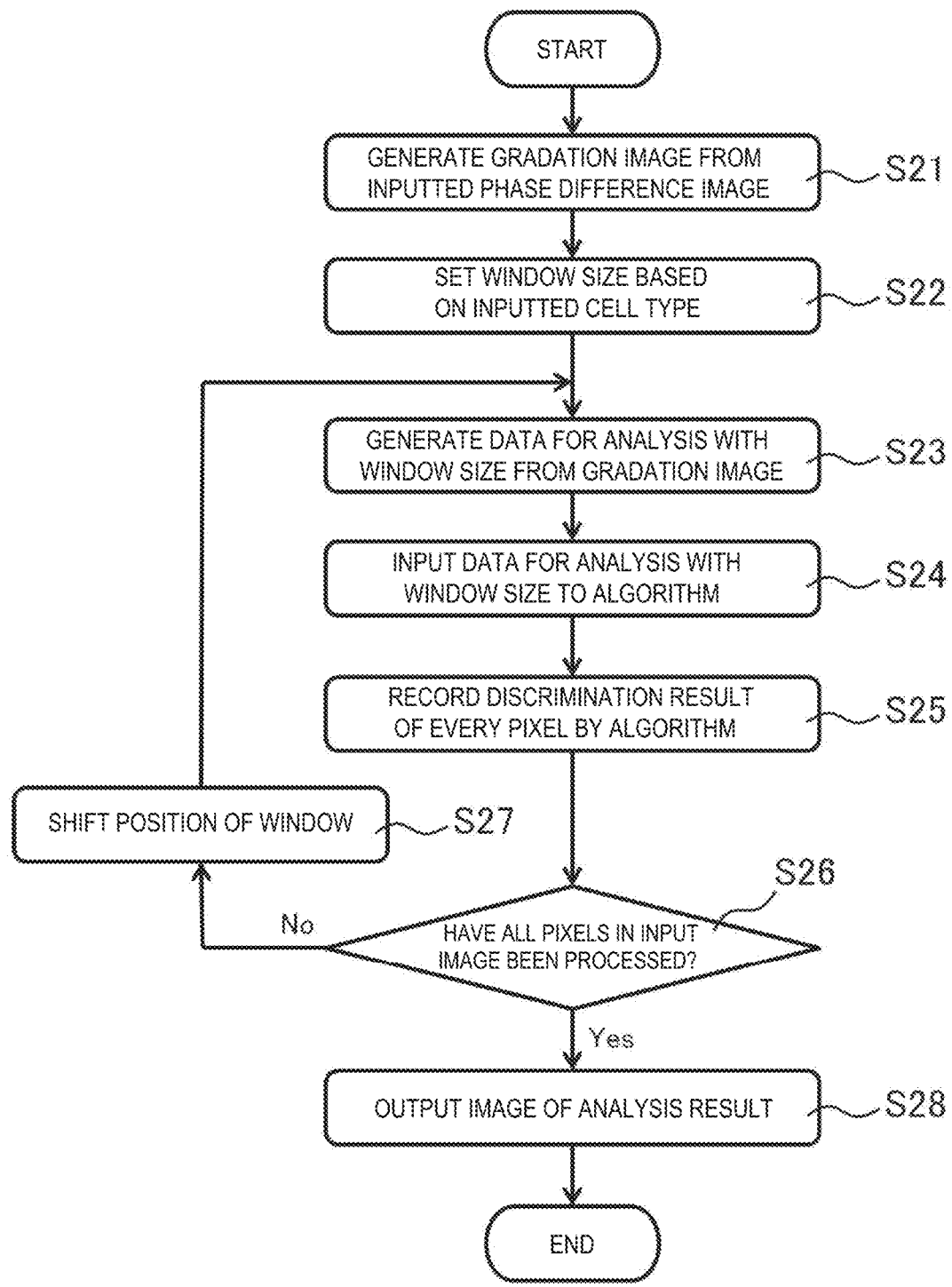
FIG. 11 is a flowchart illustrating procedure for image analysis processing.

Referring to FIG. 11, the processing section 20A in the image analysis apparatus 200A performs the processing illustrated in FIG. 11. Explaining this with reference to the function blocks illustrated in FIG. 10, the processing at steps S21 and S22 is performed by the data-for-analysis generation section 201. The processing at steps S23, S24, S26, and S27 is performed by the data-for-analysis input section 202. The processing at step S25 and S28 is performed by the analysis section 203.

At step S21, the processing section 20A generates a gradation image 79 from the inputted phase difference image 78. The method of generating the gradation image 79 is the same as the generation method at step S11 in the deep learning processing illustrated in FIG. 8.

At step S22 illustrated in FIG. 11, the processing section 20A receives input of the cell type from a user on the image analysis apparatus 200A side through the input section 26 as analysis condition. The processing section 20A refers to the window size database 104 and the algorithm database 105 based on the inputted cell type to set a window size to be used for analysis and acquire the deep learning algorithm 60 to be used for analysis. The window size is a unit of data for analysis inputted to the neural network 60 at a time and corresponds to the number of nodes in the input layer 60a. The window size is associated with the cell type and recorded in advance in the window size database 104. The window size is, for example, a size of 3×3 pixels as the window W2 illustrated in FIG. 3. The deep learning algorithm 60 is also associated with the cell type and recorded in advance in the algorithm database 105 illustrated in FIG.

At step S23 illustrated in FIG. 11, the processing section 20A generates data for analysis 80 with the window size from the gradation image 79 with the whole image size.

At step S24, the processing section 20A inputs the data for analysis 80 illustrated in FIG. 3 into the deep learning algorithm 60. In the same way as in step S15 in the deep learning processing, the window is initially positioned, for example, such that the pixel at the center of the 3×3 pixels within the window is located at the upper left corner of the data for analysis with the whole image size. The processing section 20A inputs into the input layer 60a, the values 81 of the gradation values of 3×3 pixels, 9 in total, included in the data for analysis 80 with the window size, and then the deep learning algorithm 60 outputs a discrimination result 82 at the output layer 60b.

At step S25 illustrated in FIG. 11, the processing section 20A records the discrimination result 82 outputted at the output layer 60b illustrated in FIG. 3. The discrimination result 82 is an estimated value (binary value) of the pixel at the center of the analysis 80 with the window size.

At step S26 illustrated in FIG. 11, the processing section 20A determines whether all the pixels in the input image have been processed. The input image is the gradation image 79 with the whole image size illustrated in FIG. 3. If a series of processing from step S23 to step S25 illustrated in FIG. 11 has been performed on all the pixels in the gradation image 79, the processing section 20A performs the processing at step S28.

If all the pixels in the input image have not been processed, the processing section 20A, at step S27, shifts the center position of the window W2 at a step of one pixel within the gradation image 79 illustrated in FIG. 3, as in step S19 in the deep learning processing. After that, the processing section 20A performs the series of processing from step S23 to step S25 at the new position of the window W2 after the shift. At step S25, the processing section 20A records the discrimination result 82 corresponding to the new window position after the shift. By recording the discrimination result 82 of each window size data as above for all the pixels in the data for analysis with the whole image size, a binary image 83 is obtained as the analysis result. The binary image 83 of the analysis result has the whole image size.

At step S28 illustrated in FIG. 11, the processing section 20A outputs the binary image 83 of the analysis result to the output section 27 and terminates the image analysis processing.

As described above, the user of the image analysis apparatus 200A can acquire the binary image 83 as the analysis result, by inputting the phase difference image 78 of analysis target cells into the image analysis apparatus 200A. Since the binary image 83 indicates the cell regions and the background region of the analysis target cells, the user can discriminate the cell regions as the forms of the analysis target cells.

Second Embodiment

Hereinafter, an image analysis system according to a second embodiment is described in terms of differences from the image analysis system according to a first embodiment.

[Outline of Configuration]

Figure 12:
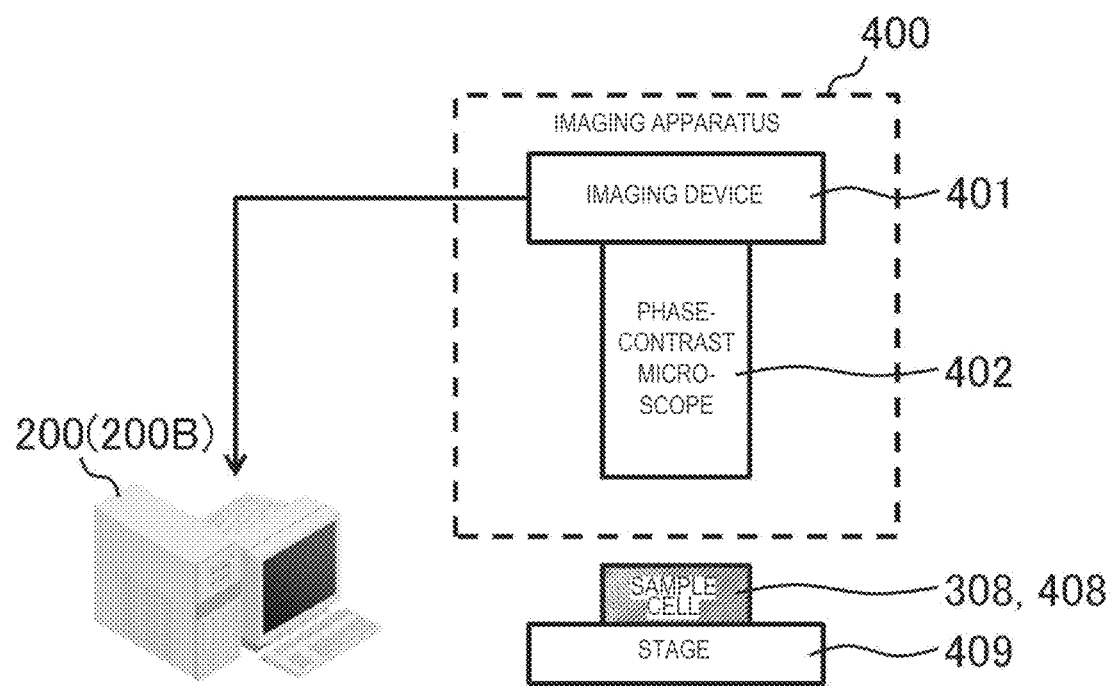
FIG. 12 is a schematic configuration diagram illustrating an image analysis system according to a second embodiment.

Referring to FIG. 12, the image analysis system according to a second embodiment includes a user side apparatus 200, which operates as an integrated image analysis apparatus 200B. The image analysis apparatus 200B includes, for example, a general-purpose computer and performs both the deep learning processing and the image analysis processing described in a first embodiment. In other words, the image analysis system according to a second embodiment is a stand-alone system that performs deep learning and image analysis on the user side and is different from the image analysis system according to a first embodiment in that the integrated image analysis apparatus 200B installed on the user side has both functions of the deep learning apparatus 100A and image analysis apparatus 200A according to a first embodiment.

The image analysis apparatus 200B is connected to an imaging apparatus 400. The imaging apparatus 400 acquires phase difference images 70 and fluorescence images 71 of learning target cells in the deep learning processing, and acquires phase difference images 78 of analysis target cells in the image analysis processing.

[Hardware Configuration]

The hardware configuration of the image analysis apparatus 200B is the same as that of the user side apparatus 200 illustrated in FIG. 6.

[Function Blocks and Processing Procedure]

Figure 13:
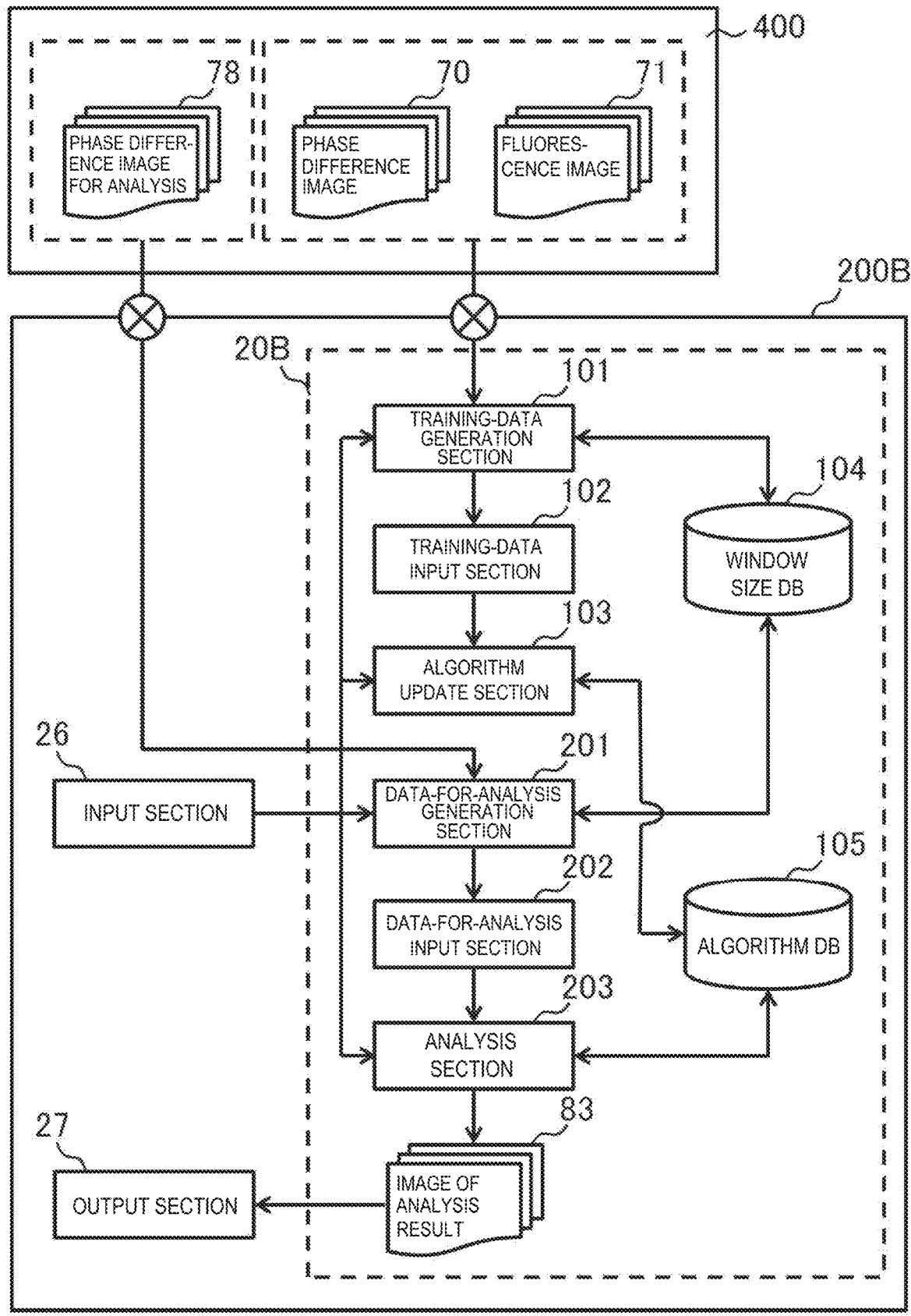
FIG. 13 is a block diagram illustrating functions of an integrated image analysis apparatus 200B according to a second embodiment.

Referring to FIG. 13, a processing section 20B in the image analysis apparatus 200B according to a second embodiment includes a training-data generation section 101, training-data input section 102, algorithm update section 103, data-for-analysis generation section 201, data-for-analysis input section 202, and analysis section 203. These function blocks are implemented by a program that causes a computer to execute deep learning processing and image analysis processing being installed into a recording section 23 or memory 22 in the processing section 20B and executed by a CPU 21. A window size database 104 and an algorithm database 105 are recorded in the recording section 23 or memory 22 in the processing section 20B, and both are used in common during deep learning and during image analysis processing. A neural network 50 before learning is stored in advance in the algorithm database 105. After the connection weights w are updated by the deep learning processing, the neural network 50 is stored in the algorithm database 105 as a deep learning algorithm 60. Note that it is assumed that phase difference images 70 and fluorescence images 71 for learning are captured beforehand by the imaging apparatus 400 and recorded in advance in the recording section 23 or memory 22 in the processing section 20B. It is assumed that phase difference images 78 of analysis target cells are also captured beforehand by the imaging apparatus 400 and recorded in advance in the recording section 23 or memory 22 in the processing section 20B.

The processing section 20B of the image analysis apparatus 200B performs the processing illustrated in FIG. 8 in the deep learning processing and the processing illustrated in FIG. 11 in the image analysis processing. Explaining this with reference to the function blocks illustrated in FIG. 13, in the deep learning processing, the processing at steps S11 to S13 and steps S18 and S19 is performed by the training-data generation section 101. The processing at step S14 is performed by the training-data input section 102. The processing at steps S15 to S17 is performed by the algorithm update section 103. In the image analysis processing, the processing at steps S21 and S22 is performed by the data-for-analysis generation section 201. The processing at steps S23, S24, S26, and S27 is performed by the data-for-analysis input section 202. The processing at steps S25 and S28 is performed by the analysis section 203.

The procedures for the deep learning processing and the image analysis processing performed by the image analysis apparatus 200B according to a second embodiment are the same as those performed by the deep learning apparatus 100A and image analysis apparatus 200A according to a first embodiment. Note that the image analysis apparatus 200B according to a second embodiment is different in the following points from the deep learning apparatus 100A and image analysis apparatus 200A according to a first embodiment.

At step S13 in the deep learning processing, the processing section 20B receives input of the type of learning target cells from a user of the image analysis apparatus 200B through an input section 26. The processing section 20B refers to the window size database 104 based on the inputted cell type to set a window size.

As described above, the user of the image analysis apparatus 200B can acquire a binary image 83 as the analysis result, by inputting the phase difference image 78 of analysis target cells into the image analysis apparatus 200B.

The image analysis apparatus 200B according to a second embodiment allows the user to use cells of the type that the user selected, as learning target cells. This means that the user himself/herself can improve the level of learning of the neural network 50, not leaving learning of the neural network 50 to the vendor side.

Third Embodiment

Hereinafter, an image analysis system according to a third embodiment is described in terms of differences from the image analysis system according to a second embodiment.

[Outline of Configuration]

Figure 14:
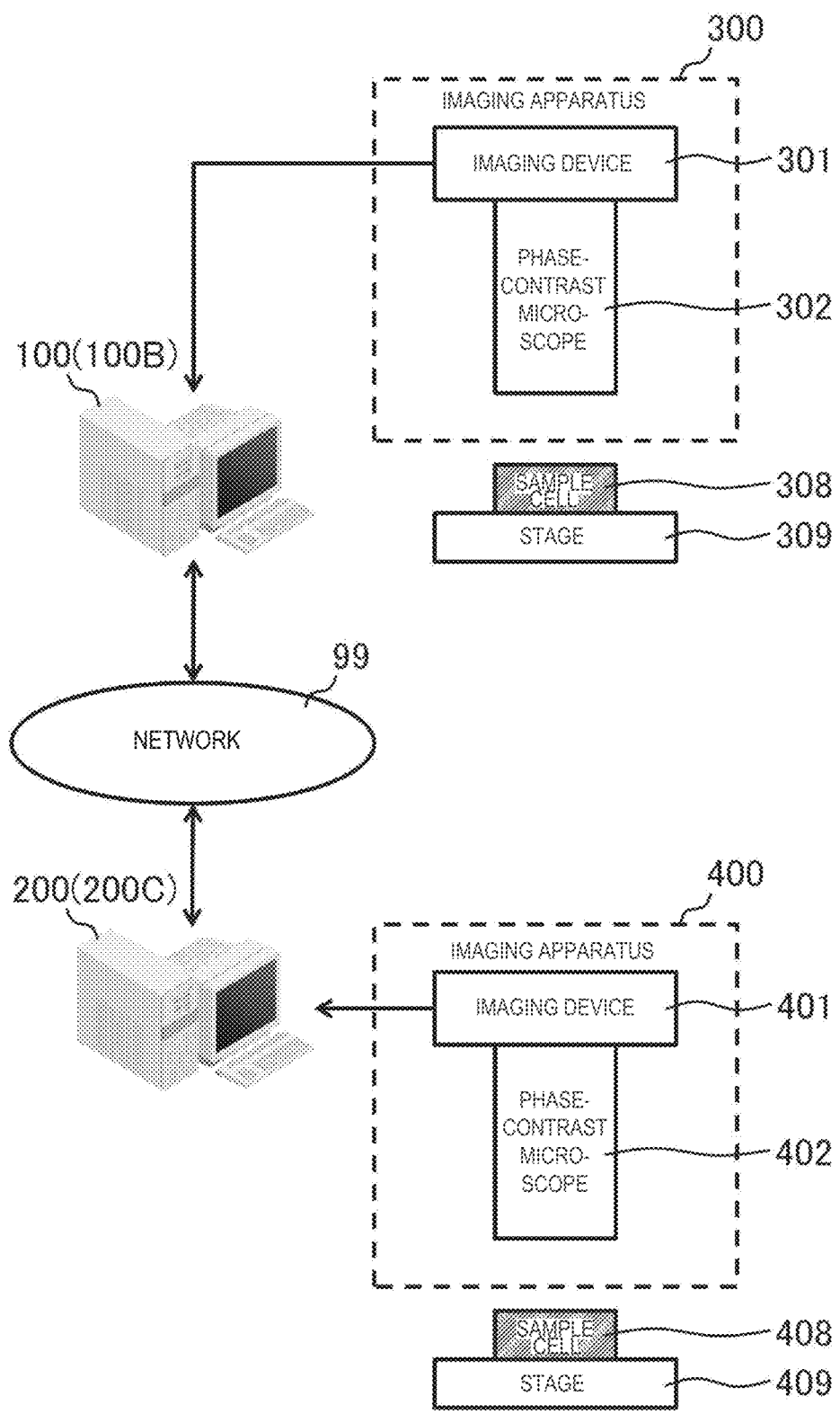
FIG. 14 is a schematic configuration diagram illustrating an image analysis system according to a third embodiment.

Referring to FIG. 14, the image analysis system according to a third embodiment includes a vendor side apparatus 100 and a user side apparatus 200. The vendor side apparatus 100 operates as an integrated image analysis apparatus 100B, and the user side apparatus 200 operates as a terminal 200C. The image analysis apparatus 100B, including, for example, a general-purpose computer, is an apparatus on a cloud server side that performs both the deep learning processing and the image analysis processing described in a first embodiment. The terminal 200C, including, for example, a general-purpose computer, is a terminal on the user side that transmits images for analysis to the image analysis apparatus 100B through a network 99, and receives images of analysis results from the image analysis apparatus 100B through the network 99.

The image analysis system according to a third embodiment is the same as that of a second embodiment in that the integrated image analysis apparatus 100B installed on the vendor side provides both functions of the deep learning apparatus 100A and the image analysis apparatus 200A according to a first embodiment. On the other hand, the image analysis system according to a third embodiment is different from that of a second embodiment in that the image analysis system according to a third embodiment includes the terminal 200C and provides an input interface for images for analysis and an output interface for images of analysis results for the terminal 200C on the user side. In other words, the image analysis system according to a third embodiment is a cloud service system in which the vendor side performing the deep learning processing and the image analysis processing provides the user side with an input and output interface for images for analysis and images of analysis results.

The image analysis apparatus 100B is connected to an imaging apparatus 300 and acquires phase difference images 70 and fluorescence images 71 of learning target cells, captured by the imaging apparatus 300.

The terminal 200C is connected to an imaging apparatus 400 and acquires phase difference images 78 of analysis target cells, captured by the imaging apparatus 400.

[Hardware Configuration]

The hardware configuration of the image analysis apparatus 100B is the same as that of the vendor side apparatus 100 illustrated in FIG. 5. The hardware configuration of the terminal 200C is the same as that of the user side apparatus 200 illustrated in FIG. 6.

[Function Blocks and Processing Procedure]

Figure 15:
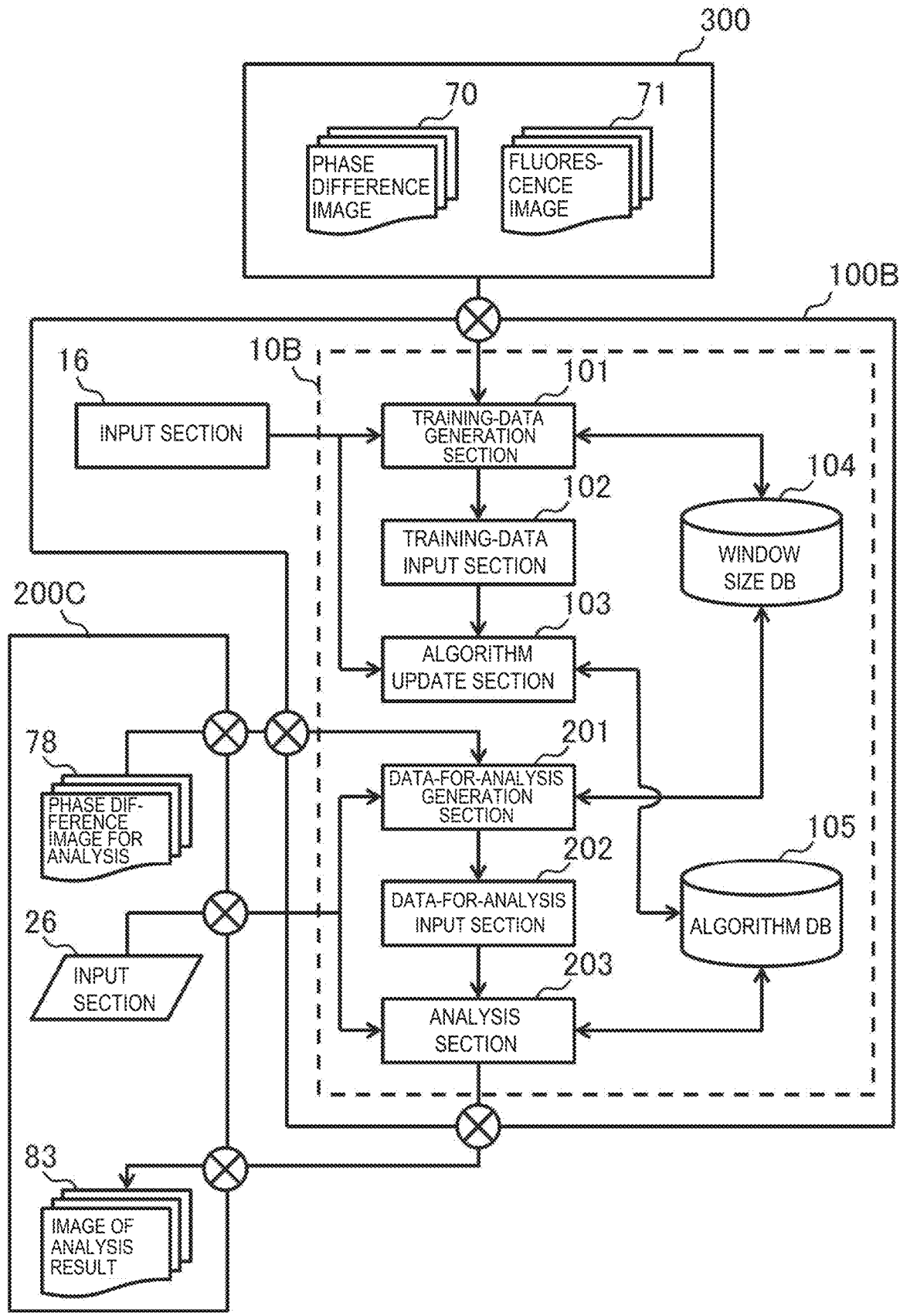
FIG. 15 is a block diagram illustrating functions of an integrated image analysis apparatus 100B according to a third embodiment.

Referring to FIG. 15, a processing section 10B in the image analysis apparatus 100B according to a third embodiment includes a training-data generation section 101, training-data input section 102, algorithm update section 103, data-for-analysis generation section 201, data-for-analysis input section 202, and analysis section 203. These function blocks are implemented by a program that causes a computer to execute the deep learning processing and the image analysis processing being installed into a recording section 13 or memory 12 in the processing section 10B and executed by a CPU 11. A window size database 104 and an algorithm database 105 are recorded in the recording section 13 or memory 12 in the processing section 10B, and both are used in common in the deep learning and in the image analysis processing. The neural network 50 before learning is stored in advance in the algorithm database 105. After the connection weights w are updated by the deep learning processing, the neural network 50 is stored in the algorithm database 105 as a deep learning algorithm 60.

Note that it is assumed that phase difference images 70 and fluorescence images 71 for learning are captured beforehand by the imaging apparatus 300 and recorded in advance in the recording section 13 or memory 12 in the processing section 10B. It is assumed that phase difference images 78 of analysis target cells are also captured beforehand by the imaging apparatus 400 and recorded in advance in a recording section 23 or memory 22 in a processing section 20C in the terminal 200C.

The processing section 10B of the image analysis apparatus 100B performs the processing illustrated in FIG. 8 in the deep learning processing and the processing illustrated in FIG. 11 in the image analysis processing. Explaining this with reference to the function blocks illustrated in FIG. 15, in the deep learning processing, the processing at steps S11 to S13 and steps S18 and S19 is performed by the training-data generation section 101. The processing at step S14 is performed by the training-data input section 102. The processing at steps S15 to S17 is performed by the algorithm update section 103. In the image analysis processing, the processing at steps S21 and S22 is performed by the data-for-analysis generation section 201. The processing at steps S23, S24, S26, and S27 is performed by the data-for-analysis input section 202. The processing at steps S25 and S28 is performed by the analysis section 203.

The procedure for deep learning processing and the procedure for image analysis processing performed by the image analysis apparatus 100B according to a third embodiment are the same as those performed by the deep learning apparatus 100A and the image analysis apparatus 200A according to a first embodiment. Note that the image analysis apparatus 100B according to a third embodiment is different in the following three points from the deep learning apparatus 100A and the image analysis apparatus 200A according to a first embodiment.

At step S21 in the image analysis processing illustrated in FIG. 11, the processing section 10B receives a phase difference image 78 of analysis target cells from the terminal 200C on the user side and generates a gradation image 79 from the received phase difference image 78. The method of generating the gradation image 79 is the same as the generation method at step S11 in the deep learning processing illustrated in FIG. 8.

At step S22 in the image analysis processing illustrated in FIG. 11, the processing section 10B receives input of a cell type as analysis condition from a user of the terminal apparatus 200C through an input section 26 of the terminal 200C. The processing section 10B refers to the window size database 104 and the algorithm database 105 based on the inputted cell type to set a window size used for analysis and acquire a deep learning algorithm 60.

At step S28 in the image analysis processing, the processing section 10B transmits a binary image 83 of the analysis result to the terminal 200C on the user side and terminates the image analysis processing. In the terminal 200C on the user side, the processing section 20C outputs the received binary image 83 of the analysis result to an output section 27.

As described above, the user of the terminal 200C can acquire the binary image 83 as the analysis result, by transmitting the phase difference image 78 of analysis target cells to the image analysis apparatus 100B.

The image analysis apparatus 100B according to a third embodiment allows the user to obtain the results of the image analysis processing without acquiring the window size database 104 and the algorithm database 105 from the deep learning apparatus 100A. This makes it possible to provide as a cloud service, the service of discriminating cell regions for a service analyzing the forms of analysis target cells.

<Supplementary Information>

Although the summary and embodiments have been described above, the present invention is not limited to the summary and the embodiments.

Although in an embodiment, the deep learning processing and the image analysis processing are performed using mesenchymal stem cells (MSCs) as analysis target cells, the analysis target cells are not limited to MSCs but may be any cells for transplantation. The cells for transplantation include stem cells and progenitor cells. The stem cells include tissue stem cells (somatic stem cells or adult stem cells), induced pluripotent step cells (iPS cells), embryonic stem cells (ES cells), and embryonic germ stem cells (EG cells). The progenitor cells include endothelial progenitor cells, smooth muscle progenitor cells, and blasts. The tissue stem cells (somatic stem cells or adult stem cells) include hematopoietic stem cells including side population (SP) cells, mesenchymal stem cells (MSC) including Muse cells, neural stem cells, satellite cells, intestinal stem cells, mammary stem cells, skin stem cells including epidermal stem cells and dermal stem cells, hepatic stem cells, pancreatic stem cells, myocardial stem cells, and germline stem cells. These cells for transplantation are preferably cells that are cultured alone as a single type (cell type). [0157] Although in first to third embodiments, the processing sections 10A, 20B, and 10B refer to the window size database 104 based on an inputted cell type at step S13 in the deep learning processing to set the number of pixels of the window size, the operator or the user may directly set the window size. In this case, the window size database 104 is not necessary.

Although in first to third embodiments, the processing sections 10A, 20B, and 10B refer to the window size database 104 based on an inputted cell type at step S13 in the deep learning processing to set the number of pixels of the window size, a cell size may be inputted instead of the cell type. The processing sections 10A, 20B, and 10B can refer to the window size database 104 based on the inputted cell size to set the number of pixels of the window size. Also at step S22 in the image analysis processing in the same way as in step S13, a cell size may be inputted instead of inputting a cell type. The processing sections 20A, 20B, and 10B can refer to the window size database 104 and the algorithm database 105 based on the inputted cell size to set the number of pixels of the window size to be used for analysis and acquire a deep learning algorithm 60 to be used for analysis.

As for how to input a cell size, a size may be inputted directly as a numerical value, or a size may be inputted by letting the user select a certain numerical range corresponding to a size that the user intends to input, using, for example, a pull-down menu as the user interface for input.

In addition, at step S13 in the deep learning processing and step S22 in the image analysis processing, imaging magnifications when phase difference images 70 and 78, and a fluorescence image 71 of cells were captured may be inputted in addition to the cell type or the cell size. As for how to input an imaging magnification, the magnification may be inputted directly as a numerical value, or the magnification may be inputted by letting the user select a certain numerical range corresponding to a magnification that the user intends to input, using, for example, a pull-down menu as the user interface for input.

At step S13 in the deep learning processing, the processing sections 10A, 20B, and 10B may refer to the window size database 104 to acquire the number of pixels of the window size based on an inputted cell type or cell size, and the processing sections 10A, 20B, and 10B may also correct the acquired number of pixels of the window size based on an inputted imaging magnification. This is because the number of pixels of the window size is a value set according to a cell size, and if the imaging magnification of cells is changed, the number of pixels representing the same window size is also changed, as described later in examples.

In first to third embodiments described above, at step S17 in the deep learning processing, the processing sections 10A, 20B, and 10B record deep learning algorithms 60 in the algorithm database 105 such that the deep learning algorithms 60 are associated with the cell types on a one-to-one basis. However, the processing sections 10A, 20B, and 10B may record the deep learning algorithms 60 in the algorithm database 105 such that one deep learning algorithm 60 is associated with multiple cell types.

Although in first to third embodiments described above, the processing sections 10A, 20B, and 10B generate a gradation image 72 as a grayscale image with 3 gradations at step S11 in the deep learning processing, the number of gradations in the grayscale image of the gradation image 72 is not limited to three but may be two or more. Similarly, although at step S21 in the image analysis processing, the processing sections 20A, 20B, and 10B generate a gradation image 79 as a grayscale image with 3 gradations, the number of gradations of the grayscale image of the gradation image 79 is not limited to three but may be two or more. As an example, the gradation of the grayscale images of gradation images 72 and 79 may have 256 steps (8 gradations) in which the brightness value ranges from value 0 to value 255.

Although in first to third embodiments described above, the processing sections 10A, 20B, and 10B generate a gradation image 72 from an inputted phase difference image 70 at step S11 in the deep learning processing, the phase difference image 70 to be inputted may be gradated in advance as a grayscale image. In other words, the processing sections 10A, 20B, and 10B may directly acquire the gradation image 72. Similarly, although the processing sections 20A, 20B, and 10B generate a gradation image 79 from an inputted phase difference image 78 at step S21 in the image analysis processing, the phase difference image 78 to be inputted may be gradated in advance as a grayscale image. In other words, the processing sections 20A, 20B, and 10B may directly acquire the gradation image 79.

Although in first to third embodiments described above, the processing sections 10A, 20B, and 10B binarize the gradations of the pixels in an inputted fluorescence image 71 to generate a true value image 73 at step S12 in the deep learning processing, the processing sections 10A, 20B, and 10B may acquire a true value image 73 which has been binarized in advance.

Although in first to third embodiments described above, phase difference images 70 and 78 are used as images of learning target cells and analysis target cells, differential interference contrast images may be used instead of phase difference images. Differential interference contrast images can be captured using a known differential interference microscope. In both phase difference images and differential interference contrast images, the contrast of an object for observation is emphasized, and these images can be acquired, for example, as bright field images.

Although in first to third embodiments described above, the processing sections 10A and 10B are integrated apparatuses, the processing sections 10A and 10B do not need to be integrated apparatuses. The processing sections 10A and 10B each may include components, such as a CPU 11, memory 12, and recording section 13, located separately and connected to one another with a network. The processing sections 10A and 10B, the input section 16, and the output section 17 also do not need to be located at one place. These sections may be located separately and communicably connected to one another with a network. This may also apply to the processing sections 20A, 20B, and 20C in the same way as for the processing sections 10A and 10B.

Although in first to third embodiments described above, the function blocks of the training-data generation section 101, training-data input section 102, algorithm update section 103, data-for-analysis generation section 201, data-for-analysis input section 202, and analysis section 203 are implemented by the single CPU 11 or the single CPU21, these function blocks do not necessarily need to be implemented by a single CPU but may be implemented separately by multiple CPUs.

Although in second and third embodiments described above, the program to perform the processing of the steps described in FIGS. 8 and 11 is recorded in advance in the recording sections 13 and 23, the program may be installed into the processing sections 10B and 20B from a computer readable non-transitory tangible recording medium 98, such as a DVD-ROM or a USB memory, for example. Alternatively, the program may be downloaded for installation from, for example, an external server (not illustrated) via the network 99 by connecting the processing sections 10B and 20B to the network 99.

Although in first to third embodiments described above, the input sections 16 and 26 are input apparatuses such as keyboards and mice, and the output sections 17 and 27 are display apparatuses such as liquid crystal displays, the input sections 16 and 26 and the output sections 17 and 27 may be integrated into display apparatuses of a touch-panel type. Alternatively, the output sections 17 and 27 may be printers, which print binary images 83 of analysis results as output.

Although in first to third embodiments described above, the imaging apparatus 300 is directly connected to the deep learning apparatus 100A or the image analysis apparatus 100B, the imaging apparatus 300 may be connected to the deep learning apparatus 100A or the image analysis apparatus 100B via the network 99. Also as for the imaging apparatus 400, although the imaging apparatus 400 is directly connected to the image analysis apparatus 200A or the image analysis apparatus 200B, the imaging apparatus 400 may be connected to the image analysis apparatus 200A or the image analysis apparatus 200B via the network 99.

EXAMPLE

Examples are described as follows to make features of one or more aspects clearer.

Example 1

[Verification of Analysis Result]

Analysis results are compared between the image analysis method according to an embodiment and the image analysis method using the threshold method described in Japanese Patent Application No. 2015-257131 (hereinafter, simply referred to as the threshold method). Cells for the analysis are MSCs. As training data, phase difference images and fluorescence images are captured with a phase difference/fluorescence microscope under the following conditions. [Phase Difference Image] seeding density: $5\times10^4$ cells/well (6 well plate), the number of captured images: 500, exposure time: 20%, 500 ms [Fluorescence Image] seeding density: $5\times10^4$ cells/well (6 well plate), the number of captured images: 500, reagent: Calcein-AM, exposure time: 20%, 500 ms.

As image data for analysis, five phase difference images are captured in the same conditions as above, and fluorescence images corresponding to these five phase difference images are captured in the same conditions as above. These five fluorescence images are binarized to generate five true value images.

A stand-alone system described in a second embodiment is used to perform the deep learning processing and the image analysis processing by the image analysis method according to an embodiment. Training data captured under the above conditions are used for the deep learning processing of the neural network. The five phase difference images are analyzed using the neural network subjected to learning, and five binary images for evaluation are obtained as the analysis result. The window size in the deep learning processing and the image analysis processing is set to 33×33 pixels.

Figure 16:
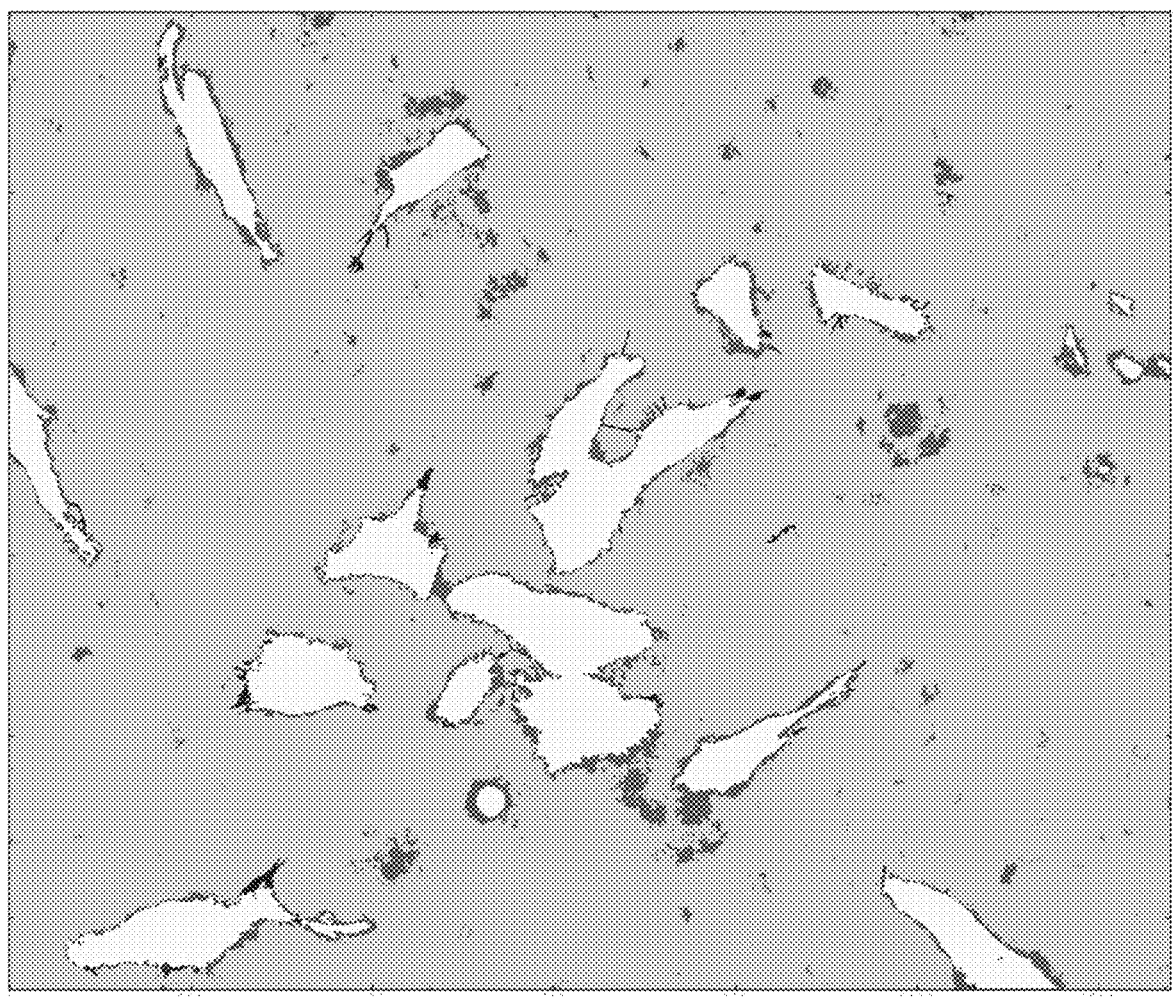
FIG. 16 is a diagram illustrating a result of comparison between a binary image of an analysis result by an image analysis method according to an embodiment and a true value image.

FIG. 16 illustrates the comparison results between a binary image of the analysis result by the image analysis method according to Example and the true value image. Comparison results are illustrated on pixel-by-pixel basis using different gradations of a grayscale The comparison results on a pixel-by-pixel basis illustrated in FIG. 16 are classified into the following four groups. "True positive" means pixels that are in cell regions in the inputted true value image and are correctly determined to be pixels in cell regions in the binary image of the analysis result. "True negative" means pixels that are in the background region in the inputted true value image and are correctly determined to be pixels in the background region in the binary image of the analysis result. "False positive" means pixels that are in the background region in the inputted true value image and are wrongly determined to be pixels in cell regions in the binary image of the analysis result. "False negative" means pixels that are in cell regions in the inputted true value image and are wrongly determined to be pixels in the background region in the binary image of the analysis result.

Expressing sensitivity with the following Formula 13, the sensitivity of the binary image of the analysis result using the image analysis method according to an embodiment, illustrated in FIG. 16, is 0.953.

[Math. 17]

$$\text{Sensitivity} = \frac{\text{Pixels in Binary Image} \cap \text{Pixels in True Value Image}}{\text{Pixels in True Value Image}} \quad \text{(Formula 13)}$$

Figure 17:
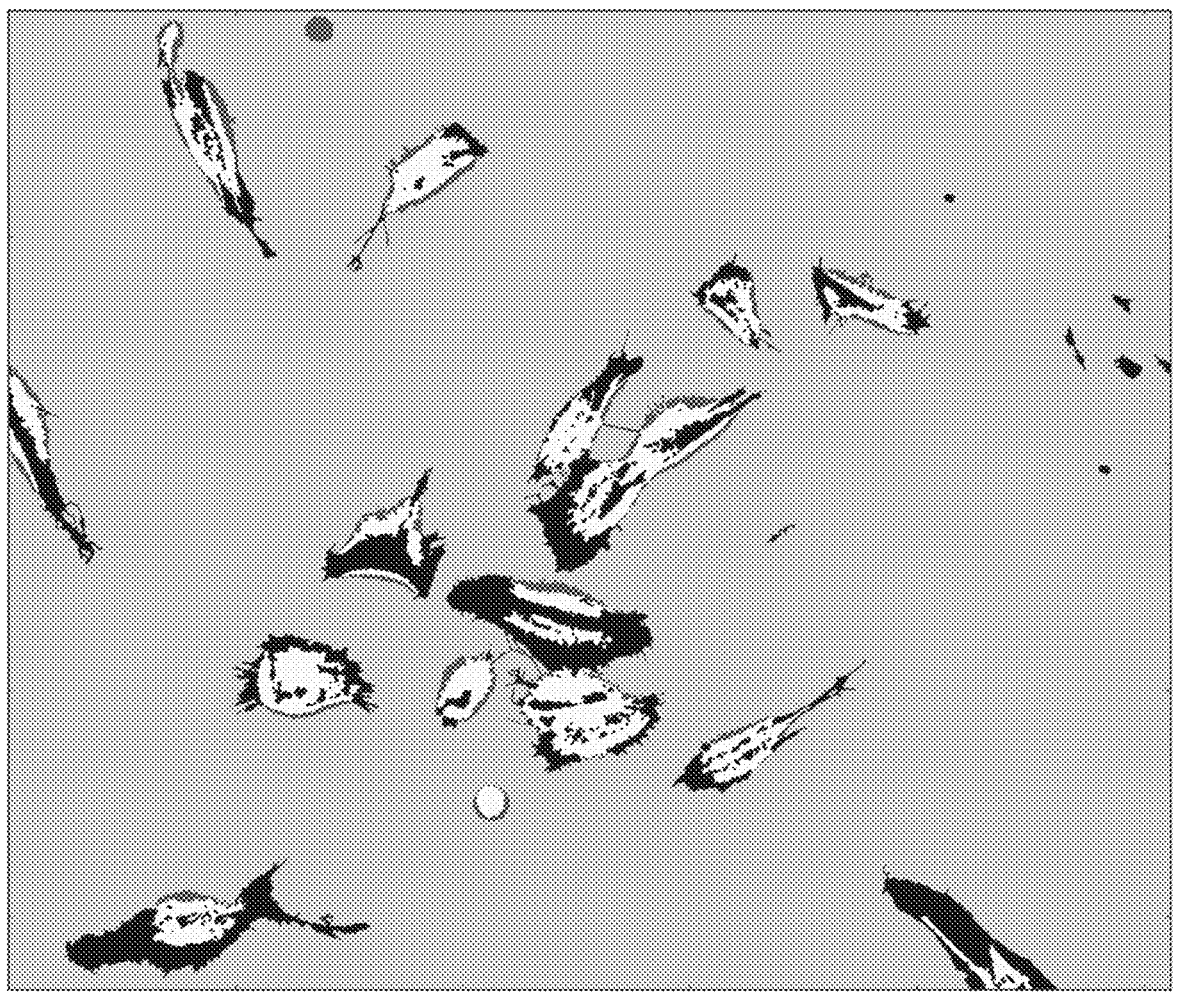
FIG. 17 is a diagram illustrating a result of comparison between a binary image of an analysis result by the threshold method and a true value image.

FIG. 17 illustrates the comparison results between a binary image of the analysis result using the threshold method described in Japanese Patent Application No. 2015-257131 and the true value image. In the same way as in FIG. 16, comparison results on a pixel-by-pixel basis are indicated using different gradations of a grayscale. The sensitivity of the binary image of the analysis result using the threshold method, illustrated in FIG. 17, is 0.432.

In the image of the analysis result using the image analysis method according to an embodiment, illustrated in FIG. 16, the number of pixels determined to be "false negative" are significantly decreased compared to the image of the analysis result using the threshold method. In other words, the analysis using the image analysis method according to an embodiment makes it possible to determine that the pixels that should be determined to be in the cell regions are in the cell regions correctly with higher sensitivity than that of the threshold method.

Table 1 illustrates the results of comparing the five binary images for evaluation, analyzed using the image analysis method according to an embodiment, to the respective true value images.

TABLE 1

|  | Minimum | Average | Maximum | Standard Deviation |
| --- | --- | --- | --- | --- |
| Sensitivity | 0.909 | 0.930 | 0.953 | 0.017 |
| Specificity | 0.959 | 0.969 | 0.981 | 0.009 |
| Positive Predictive Value | 0.704 | 0.798 | 0.853 | 0.065 |
| Negative Predictive Value | 0.985 | 0.990 | 0.995 | 0.004 |

As illustrated in Table 1, the sensitivity is 0.9 or more even at minimum. The image analysis method according to an embodiment correctly discriminate cell regions with sensitivity higher than the threshold method.

Example 2

[Optimization of Window Size]

The window size in the image analysis method according to an embodiment is optimized. As conditions for the experiment, analysis target cells are MSCs (with a size of about 40 µm); the number of training data images used for learning (the number of pairs of a phase difference image and a fluorescence image) is 60,800; and the number of images used for verification is 15,200.

Figure 18:
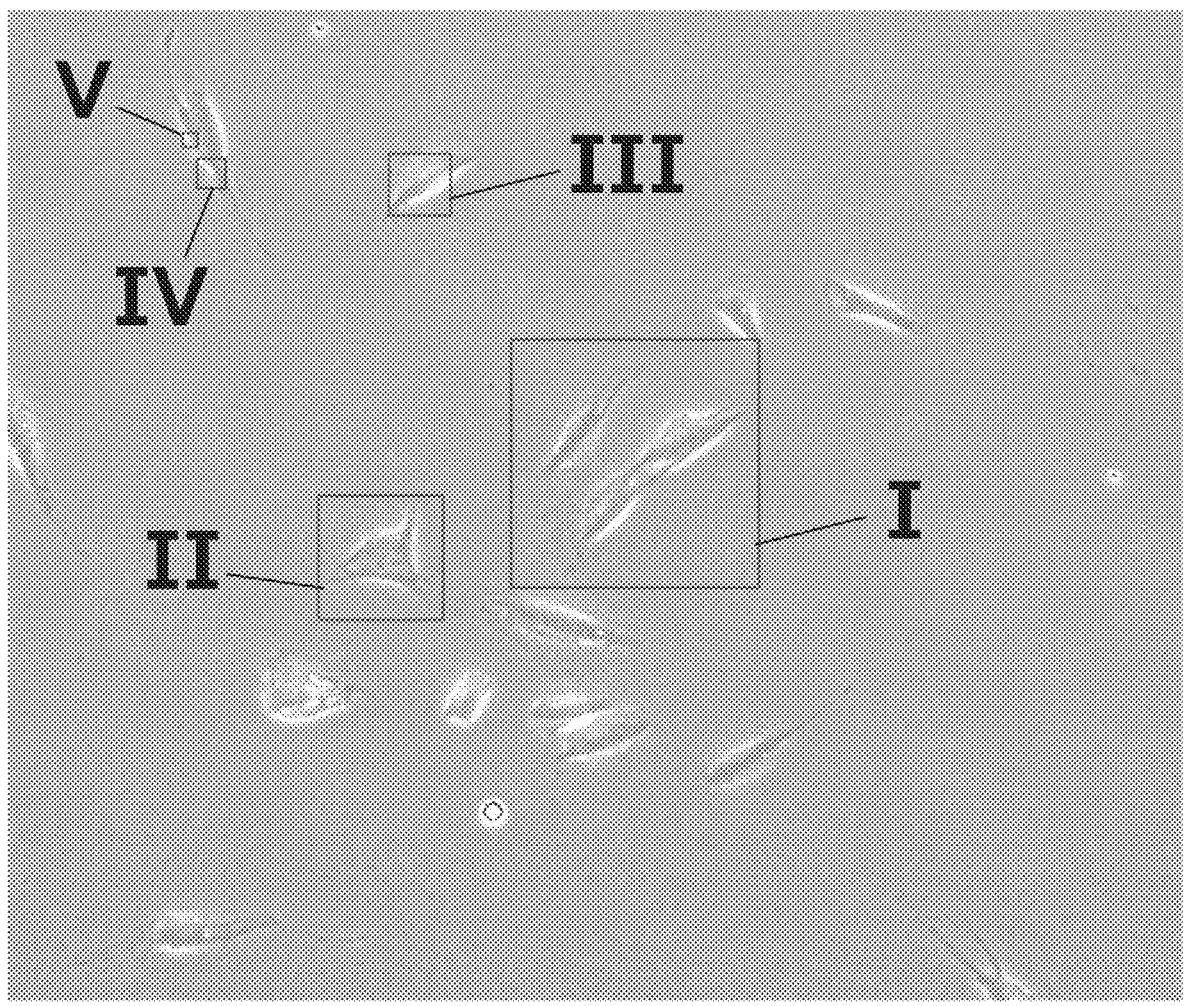
FIG. 18 is a diagram illustrating window sizes used for optimization.

FIG. 18 illustrates window sizes used for optimization. The deep learning processing is performed using five window sizes, "I", "II", "III", "IV", and "V" in descending order of the window size, and then, the image analysis processing is performed using the same window size as in the deep learning processing to obtain binary images of the analysis results. Table 2 illustrates the experiment results.

TABLE 2

| Window Size | 33 | 67 | 135 | 271 | 541 |
| --- | --- | --- | --- | --- | --- |
| Dimensional Size by Conversion [µm] | 10.8 | 21.5 | 42.9 | 85.8 | 171.61 |

TABLE 2-continued

| valid_misclass | 0.92119 | 0.934 | 0.942 | 0.940 | 0.9119 |
|---|---|---|---|---|---|
| | V | IV | III | II | I |

In Table 2, the value "valid_misclass" (hereinafter, called the valid_misclass value) is the proportion of true positive pixels and true negative pixels to the entire image. A valid_misclass value higher and closer to "1" means that pixels in cell regions are determined to be in the cell regions more correctly, and that pixels in the background region is determined to be in the background region more correctly. In other words, it means that the sensitivity of the determination is higher. According to the experiment result illustrated in Table 2, the window size "III" makes the valid_misclass value the maximum value, 0.942, providing a high determination sensitivity. The window size 42.9 μm of this "III" is approximately equivalent to the dimensional size of MSCs used in the experiment (approximately 40 μm). In addition, even when the window size of "IV" or "II" is used, the valid_misclass value is larger than or equal to 0.93, a relatively high sensitivity is obtained. As described above, the results of the experiment illustrated in Table 2 indicates that the window size range preferable to MSCs is a range of about 20 to 90 μm.

The results of the experiment in Table 2 indicate that the window size that should be set in the deep learning processing and the image analysis processing is almost the same as the size of analysis target cells. Next, based on this finding, the range of setting values for the window size is examined for various cells used for the experiment other than MSCs.

For example, studies are conducted for the case where red blood cells are specified as the type of cells that the neural network learns, and the regions of red blood cells and the background region are discriminated in phase difference images capturing red blood cells as analysis targets, using the neural network subjected to learning. In this case, it is preferable that the window size to be set in the deep learning processing and the image analysis processing be within a range of about 2.5 to about 10 μm, which corresponds to the dimensional size of red blood cells (about 5 μm).

Similarly, in the case where the regions of cancer cells and the background region are discriminated, it is preferable that the window size to be set in the deep learning processing and the image analysis processing be within a range of about 50 to about 200 μm, which corresponds to the dimensional size of cancer cells (about 100 μm).

In the experiment using MSCs, the valid_misclass value is the largest when the window size is at around the average size of MSCs. This is because when the window size is set to fit about the average size of target cells, most of the MSCs included in an image for analysis are caught within the window, and the neural network can learn by correctly understanding the region of each cell. Thus, setting the window size according to the type of analysis target cells improves the discrimination accuracy of the neural network and also improves the analysis accuracy of cell regions obtained as analysis results.

The invention claimed is:

1. An image analysis method of analyzing a form of a cell using a deep learning algorithm with a structure of a neural network, comprising:
generating data for analysis from an image for analysis in which an analysis target cell is captured, wherein the data for analysis includes values of target pixels of the image for analysis;
inputting the data for analysis into the deep learning algorithm that is trained to identify each of the target pixels selectively at least from a pixel of an analysis target cell or a pixel of background; and
outputting from the deep learning algorithm labels indicating whether each of the target pixels is a pixel of an analysis target cell or a pixel of background based on the inputted data for analysis, wherein
the data for analysis generated from the image for analysis comprises data for analysis for each area containing a certain number of pixels in the image for analysis,
the certain number of pixels comprises one of the target pixels and pixels surrounding the one of the target pixels, and
the deep learning algorithm generates the label indicating whether the one of the target pixels is the pixel of an analysis target cell or the pixel of background based on the inputted data for analysis.

2. The image analysis method according to claim 1, wherein
the analysis target cell captured in the image for analysis comprises a plurality of the analysis target cells.

3. The image analysis method according to claim 1, wherein
the image for analysis comprises a phase difference image or a differential interference contrast image of the analysis target cell.

4. The image analysis method according to claim 1, wherein
the image for analysis comprises an image in which a plurality of analysis target cells, apart from one another, are captured.

5. The image analysis method according to claim 1, wherein
the deep learning algorithm discriminates respective forms of a plurality of analysis target cells, apart from one another.

6. The image analysis method according to claim 1, wherein
the image for analysis comprises an image in which a cell of a single type is captured.

7. The image analysis method according to claim 1, wherein
the image for analysis comprises an image in which a cell for transplantation is captured.

8. The image analysis method according to claim 1, wherein
training data used for learning of the deep learning algorithm is generated based on a fluorescence image of a stained cell.

9. The image analysis method according to claim 1, wherein
an output layer of the neural network is a node including a softmax function as an activation function.

10. An image analysis method of analyzing a form of a cell using a deep learning algorithm with a structure of a neural network, comprising:
generating data for analysis from an image for analysis in which an analysis target cell is captured, wherein the data for analysis includes values of target pixels of the image for analysis;
inputting the data for analysis into the deep learning algorithm that is trained to identify each of the target pixels selectively at least from a pixel of an analysis target cell or a pixel of background; and
outputting from the deep learning algorithm labels indicating whether each of the target pixels is a pixel of an analysis target cell or a pixel of background based on the inputted data for analysis, wherein the data for analysis generated from the image for analysis comprises data for analysis for each area containing a certain number of pixels in the image for analysis, and a number of the certain number of pixels is equal to a number of nodes in an input layer of the neural network.

11. An image analysis method of analyzing a form of a cell using a deep learning algorithm with a structure of a neural network, comprising:

generating data for analysis from an image for analysis in which an analysis target cell is captured, wherein the data for analysis includes values of target pixels of the image for analysis;

inputting the data for analysis into the deep learning algorithm that is trained to identify each of the target pixels selectively at least from a pixel of an analysis target cell or a pixel of background; and outputting from the deep learning algorithm labels indicating whether each of the target pixels is a pixel of an analysis target cell or a pixel of background based on the inputted data for analysis, wherein the data for analysis generated from the image for analysis comprises data for analysis for each area containing a certain number of pixels in the image for analysis, and each area is different depending on a type or a size of the analysis target cell.

12. An image analysis apparatus that analyzes a form of a cell using a deep learning algorithm with a structure of a neural network, comprising a processing section that:

generates data for analysis from an image for analysis in which an analysis target cell is captured, wherein the data for analysis includes values of target pixels of the image for analysis;

inputs the data for analysis into the deep learning algorithm that is trained to identify each of the target pixels selectively at least from a pixel of an analysis target cell or a pixel of background; and outputs from the deep learning algorithm labels indicating whether each of the target pixels is a pixel of an analysis target cell or a pixel of background based on the inputted data for analysis, wherein the data for analysis generated from the image for analysis comprises data for analysis for each area containing a certain number of pixels in the image for analysis, the certain number of pixels comprises one of the target pixels and pixels surrounding the one of the target pixels, and the deep learning algorithm generates the label indicating whether the one of the target pixels is the pixel of an analysis target cell or the pixel of background based on the inputted data for analysis.

13. A non-transitory computer-readable recording medium storing a computer program that is used to analyze a form of a cell using a deep learning algorithm with a structure of a neural network and causes a computer to perform operations comprising:

generating data for analysis from an image for analysis in which an analysis target cell is captured, wherein the data for analysis includes values of a target pixels of the image for analysis;

inputting the data for analysis into the deep learning algorithm that is trained to identify each of the target pixels selectively at least from a pixel of an analysis target cell or a pixel of background; and outputting from the deep learning algorithm labels indicating whether each of the target pixels is a pixel of an analysis target cell or a pixel of background based on the inputted data for analysis, wherein the data for analysis generated from the image for analysis comprises data for analysis for each area containing a certain number of pixels in the image for analysis, the certain number of pixels comprises one of the target pixels and pixels surrounding the one of the target pixels, and the deep learning algorithm generates the label indicating whether the one of the target pixels is the pixel of an analysis target cell or the pixel of background based on the inputted data for analysis.

14. An image analysis method of analyzing a form of a cell using a deep learning algorithm with a structure of a neural network, comprising:

generating data for analysis from an image for analysis in which an analysis target cell is captured, wherein the data for analysis includes values of target pixels of the image for analysis;

inputting the data for analysis into the deep learning algorithm that is trained to identify each of the target pixels selectively at least from a pixel of an analysis target cell or a pixel of background; and outputting an analyzed image of the image for analysis indicating a cell region and a background region based on outputs from the deep learning algorithm, wherein the data for analysis generated from the image for analysis comprises data for analysis for each area containing a certain number of pixels in the image for analysis, the certain number of pixels comprises one of the target pixels and pixels surrounding the one of the target pixels, and the deep learning algorithm generates the label indicating whether the one of the target pixels is the pixel of an analysis target cell or the pixel of background based on the inputted data for analysis.

15. An image analysis apparatus that analyzes a form of a cell using a deep learning algorithm with a structure of a neural network, comprising a processing section that:

generates data for analysis from an image for analysis in which an analysis target cell is captured, wherein the data for analysis includes values of target pixels of the image for analysis;

inputs the data for analysis into the deep learning algorithm that is trained to identify each of the target pixels selectively at least from a pixel of an analysis target cell or a pixel of background; and outputs an analyzed image of the image for analysis indicating a cell region and a background region based on outputs from the deep learning algorithm, wherein the data for analysis generated from the image for analysis comprises data for analysis for each area containing a certain number of pixels in the image for analysis, the certain number of pixels comprises one of the target pixels and pixels surrounding the one of the target pixels, and the deep learning algorithm generates the label indicating whether the one of the target pixels is the pixel of an analysis target cell or the pixel of background based on the inputted data for analysis.

16. A non-transitory computer-readable recording medium storing a computer program that is used to analyze a form of a cell using a deep learning algorithm with a structure of a neural network and causes a computer to perform operations comprising:

generating data for analysis from an image for analysis in which an analysis target cell is captured, wherein the data for analysis includes values of target pixels of the image for analysis;

inputting the data for analysis into the deep learning algorithm that is trained to identify each of the target pixels selectively at least from a pixel of an analysis target cell or a pixel of background; and outputting an analyzed image of the image for analysis indicating a cell region and a background region based on outputs from the deep learning algorithm, wherein the data for analysis generated from the image for analysis comprises data for analysis for each area containing a certain number of pixels in the image for analysis, the certain number of pixels comprises one of the target pixels and pixels surrounding the one of the target pixels, and the deep learning algorithm generates the label indicating whether the one of the target pixels is the pixel of an analysis target cell or the pixel of background based on the inputted data for analysis.

17. An image analysis method of analyzing a form of a cell using a deep learning algorithm with a structure of a neural network, comprising:

generating data for analysis from an image for analysis in which an analysis target cell is captured, wherein the data for analysis includes values of target pixels of the image for analysis;

inputting the data for analysis into the deep learning algorithm that is trained to identify each of the target pixels selectively at least from a pixel of an analysis target cell or a pixel of background; and outputting an analyzed image of the image for analysis indicating a cell region and a background region based on outputs from the deep learning algorithm, wherein the data for analysis generated from the image for analysis comprises data for analysis for each area containing a certain number of pixels in the image for analysis, and a number of the certain number of pixels is equal to a number of nodes in an input layer of the neural network.

18. An image analysis method of analyzing a form of a cell using a deep learning algorithm with a structure of a neural network, comprising:

generating data for analysis from an image for analysis in which an analysis target cell is captured, wherein the data for analysis includes values of target pixels of the image for analysis;

inputting the data for analysis into the deep learning algorithm that is trained to identify each of the target pixels selectively at least from a pixel of an analysis target cell or a pixel of background; and outputting an analyzed image of the image for analysis indicating a cell region and a background region based on outputs from the deep learning algorithm, wherein the data for analysis generated from the image for analysis comprises data for analysis for each area containing a certain number of pixels in the image for analysis, and each area is different depending on a type or a size of the analysis target cell.

* * * * *